United States Patent [19]
Flannagan et al.

[11] Patent Number: 5,119,291
[45] Date of Patent: Jun. 2, 1992

[54] MODULAR DATA STORAGE DIRECTORIES FOR LARGE-CAPACITY DATA STORAGE UNITS WHEREIN THE INDEX TO THE RECORDS IN A SECTOR IS LOCATED IN THE NEXT ADJACENT SECTOR

[75] Inventors: William J. Flannagan; Ronald M. Kern; John E. Kulakowski; Robert E. Wagner, all of Tucson, Ariz.

[73] Assignee: International Business Machines Corporation, Armonk, N.Y.

[21] Appl. No.: 517,287

[22] Filed: May 1, 1990

Related U.S. Application Data

[60] Continuation of Ser. No. 268,445, Nov. 8, 1988, abandoned, which is a division of Ser. No. 30,393, Mar. 26, 1987, Pat. No. 4,827,462.

[51] Int. Cl.⁵ .............................................. G06F 12/00
[52] U.S. Cl. .................................. 395/275; 364/248.1; 364/236.2; 364/DIG. 1; 395/400; 395/600
[58] Field of Search ... 364/200 MS File, 900 MS File

[56] References Cited

U.S. PATENT DOCUMENTS

| | | | |
|---|---|---|---|
| 4,420,807 | 12/1983 | Nolta et al. | 364/200 |
| 4,468,728 | 8/1984 | Wong | 364/200 |
| 4,575,827 | 3/1986 | Kulakowski | 365/230 |
| 4,611,272 | 9/1986 | Lomet | 364/200 |
| 4,682,318 | 7/1987 | Busby | 369/59 |
| 4,791,623 | 12/1988 | Deiotte | 369/59 |
| 4,945,475 | 7/1990 | Bruffey et al. | 364/200 |
| 4,953,122 | 8/1990 | Williams | 371/10.1 |

OTHER PUBLICATIONS

IEEE Transactions on Magnetics "Laser Mass Memory System" E. E. Gray, Sep. 1972, pp. 416-420, FIG. 2.
IBM Personal Computer Language Series Disk Operating System (DOS 2.1), 1983 1502343, pp. 5-25 and 4-9 only.

*Primary Examiner*—Lawrence E. Anderson
*Attorney, Agent, or Firm*—H. F. Somermeyer

[57] ABSTRACT

An updatable and expandable directory structure and resultant access procedures emulating a write-once or indelible record medium to a rewriteable record medium as to accessing characteristics. The directory is indexed; one directory header for a first set of files indexes another set of files. Sector clusters or data extends are managed such that random recording from any file proceeds independently of write-once characteristics. The directory is stored on the medium as data is recorded. Each directory entry contains an archival history of recording of a related data file in the medium. Both logical and physical addressing is employable.

4 Claims, 6 Drawing Sheets

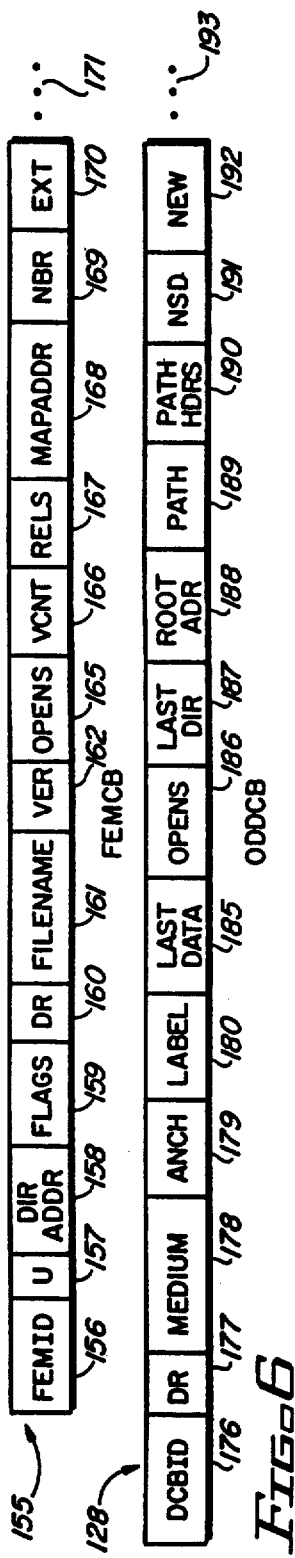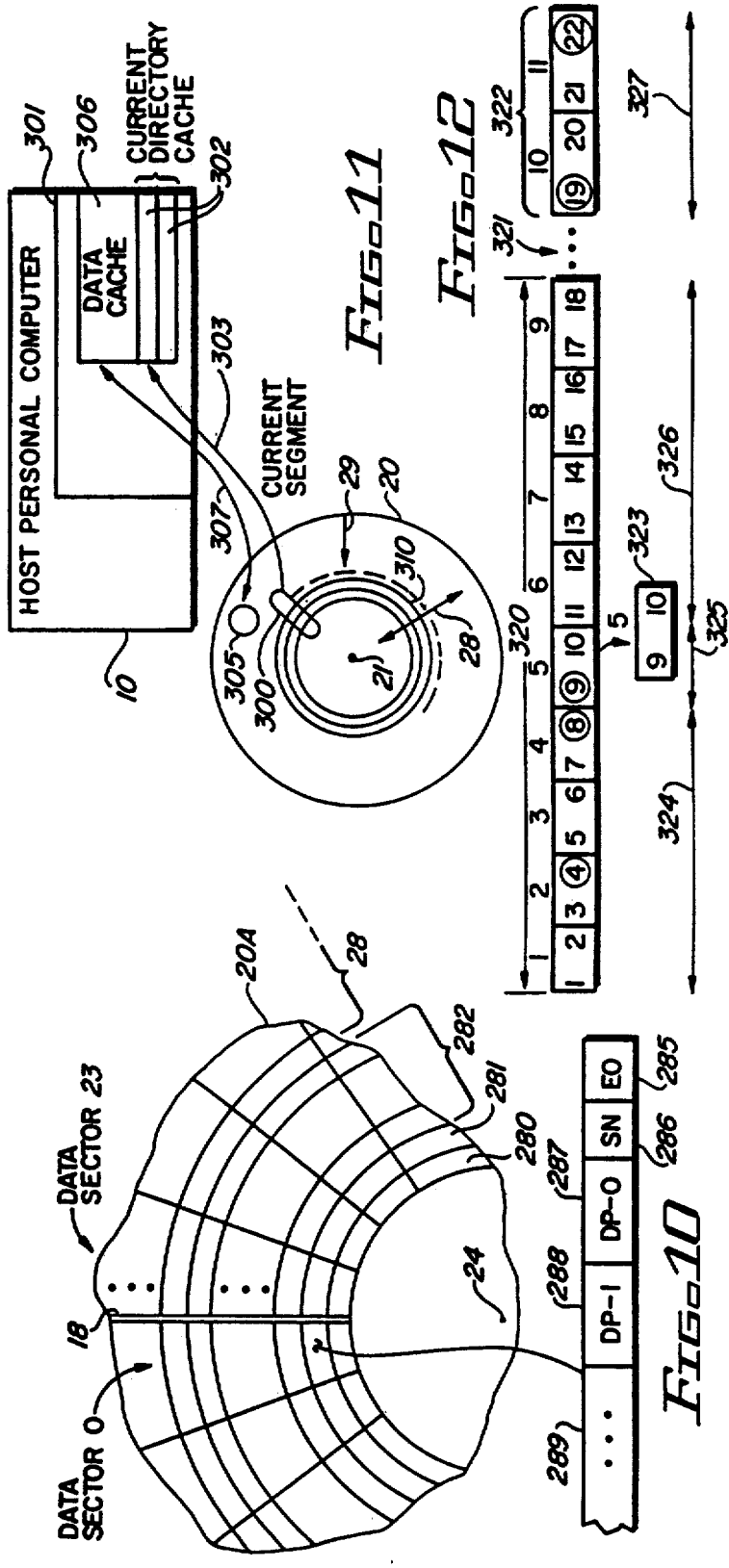

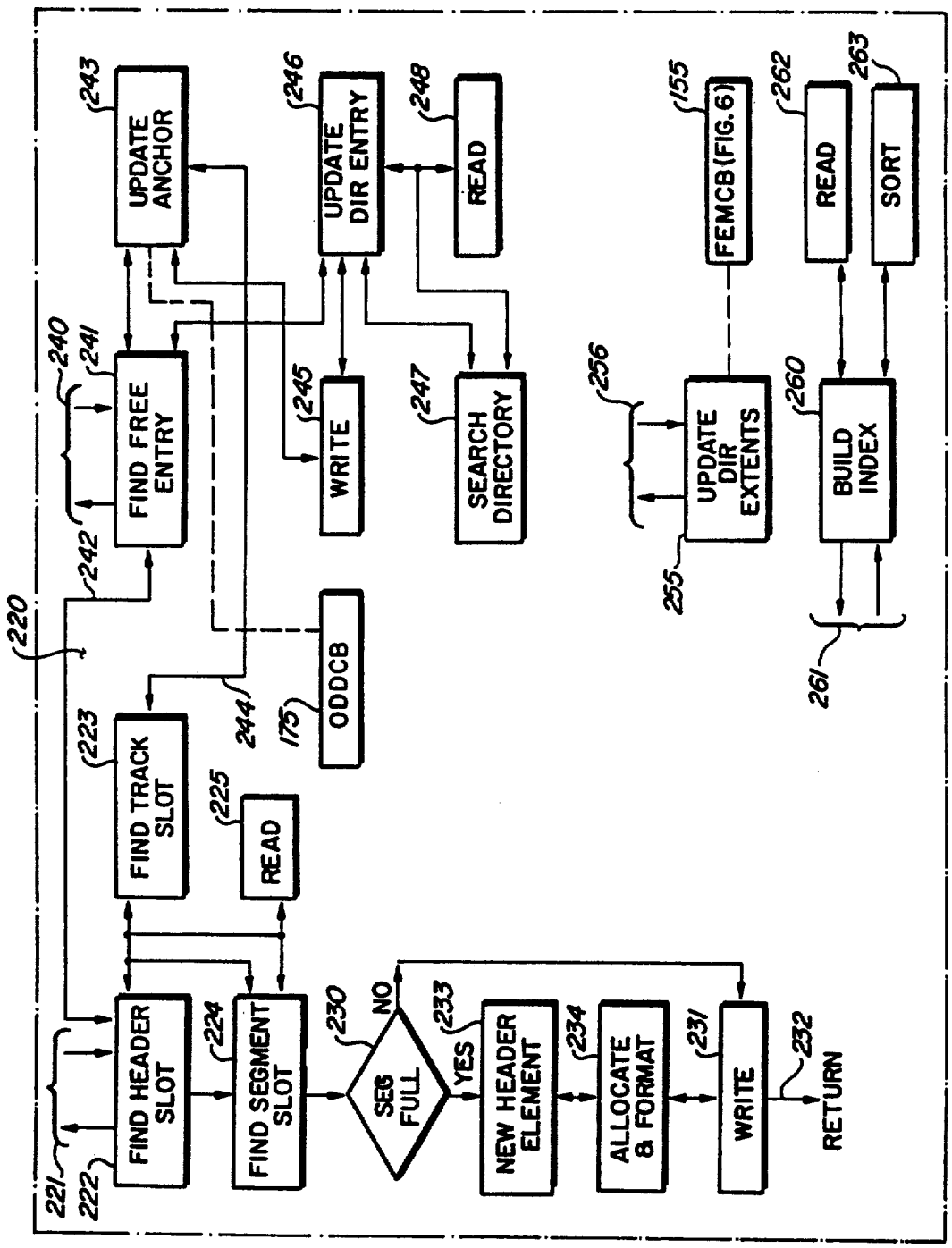

MODULAR DATA STORAGE DIRECTORIES FOR LARGE-CAPACITY DATA STORAGE UNITS WHEREIN THE INDEX TO THE RECORDS IN A SECTOR IS LOCATED IN THE NEXT ADJACENT SECTOR

This is a continuation of application Ser. No. 07/268,445, filed Nov. 8, 1988, now abandoned, which is a division of application Ser. No. 07/030,393, filed Mar. 26, 1987, now U.S. Pat. No. 4,827,462.

DOCUMENTS INCORPORATED BY REFERENCE

U.S. Pat. No. 4,575,827.

Copending commonly assigned application for patent Ser. No. 733,421 filed May 13, 1985, now U.S. Pat. No. 4,813,011.

FIELD OF THE INVENTION

The present invention relates to data storage apparatus, more particularly to directories employable with and in such apparatus. The invention is most advantageously employed with indelible, or write-once, recording apparatus which often may include a so-called write-once optical disk data recorder.

BACKGROUND OF THE INVENTION

Directories are employed for accessing data in computerized data bases. A common form of directory is the so-called "tree" directory wherein an upper directory level points to a lower directory level which, in turn, points to possibly lower directory levels which, in turn, identify the location of data which can be accessed. The highest level of the directory is often called the "root directory". An example of such a directory structure is used in disk operating systems (DOS) of the IBM Personal Computer Computer Language Series identified by Manual Part Number 1502343, Copyright 1983, International Business Machines Corporation, Armonk, N.Y. The directory structure can be viewed in DOS by either a TREE command or a directory command DIR. The DOS command PATH which can be used as a SET SEARCH directory command identifies a path to the various directory levels to access a single file or group of files. In DOS, each file is referred to by a filename with an optional extension of three alphabetic characters. The filename and extension are separated by a period. Another example of a tree directory is shown in Wang, U.S. Pat. No. 4,468,728.

In DOS Version 2.1, as used on the IBM Personal Computer XT machine, the root directory is stored in an outer track of a so-called hard disk (magnetic storage), whereas the various lower levels called "subdirectories" are dispersed throughout the data storage disk. The system works fine for magnetic data storage disks which are rewritable and in which the capacity of the disk are relatively modest, i.e., less than 50 megabytes of storage. Therefore, it is desired to have an improved tree type of directory usable with DOS and other operating systems for efficiently managing data stored on a large capacity disk, i.e., 200 megabytes and more. Such management should be conducted without extensive requirements for large compute power.

Some optical disks are so-called "write-once disks"; that is, recording on the disk surface results in a nonreversible recording such as by ablation, change between amorphous and crystalline material states, changing the topography of the disk without ablation, changing color of the disk, and the like. Write once is also termed "indelible recording". In a data processing environment, as opposed to a video or image-capturing environment, the data to be stored on the disk as updates to files do not, in general, occur in a linear fashion. This means the size of the directory needed for describing the data to be stored cannot be predetermined; that is, a directory management technique is required which will make the best use of the data storage space while minimizing directory search time for locating allocated data storage locations on the disk (also termed data storage space). In other words, the information available in each directory block should be maximized while minimizing consumption of data storage space and directory search times for accessing such allocated space. Each directory should have its allocated data storage space filled to the utmost which simultaneously conserves data storage space while reducing search time.

While the principles and philosophies set forth above are of particular interest to indelibly-recorded data, the principles involved are also applicable to rewritable, or reversible, data storage.

In either type of storage, the addition of data to be stored in the nonlinear manner means that the directory will increase in size. Accordingly, the directory structure should be completely modular and self-contained insofar as it is constructed while permitting extensive changes and extensions. In another aspect, which is of particular interest to indelible recording, an optical data storage disk, for example, may be prepared with a read-only segment. Such read-only segment may employ the same type of recording as used in the to be received indelible recording. When the optical disk is shipped from a factory, the read-only portion, of course, is recorded on the disk; it will have a corresponding modular directory for that read-only data. When a user receives the disk, the user can add additional data and modularly expand the directory such that when the disk has been filled with data, there is a single directory for all of the data and stored on the disk. The directory should also be changeable to accommodate defragmentation of data on the indelible recording. This action is achieved by adding additional modules to the data that are recorded, as well as to the directory.

Search time in any directory can be critical to the success of a data storage device as well as the rapid access to a data base. Such searching has been facilitated through the use of indexing the data base or the directory structure. An example of indexing is shown in U.S. Pat. No. 4,611,272. To identify or locate data, only the index need be searched; this fact means that fewer data entries need be examined for finding the data, hence reducing the search time. In some data bases, one of the fields in each entry is designated as the index field. Usually, such index field is selected to be the first-entered field, i.e., the first field occurring at the beginning of each entry area and which would always be the first field accessed. The informational contents of such fields can be extracted from the data base and set up in a separate data base index with the data base index being searched independently of the data entries. A limitation to such a system is to ensure the proper selection of which field to use as an index. Other data bases permit any one of the fields to be used as an index field with that field being extracted into a separate file. Of course, in both situations, additional data storage space is required for storing the separate index file. Tree-type data directories have been indexed in a similar manner. An improved indexing scheme is desired, particularly for accommodating an expandable modular directory for handling multiple versions of data in a relatively simple manner while minimizing costly software overhead.

In write-once, or indelible, recording technologies it is desired to completely fill as much of the disk sectors, or data storage areas, as possible. Accordingly, it is further desired to provide an expandable modular directory which tends to maximize utilization of data storage space while keeping the directory relatively compact for rapid index searching.

SUMMARY OF THE INVENTION

A directory has filenames for identifying files of data stored in a data storage device and includes first address pointers respectively associated with the filenames for pointing to the locations of the files respectively identified by such filenames. The directory is preferably stored in the data storage device. The filenames and associated respective first address pointers are stored in a first plurality of segment modules within the directory. A second plurality, less than the first plurality, of directory header modules are in the directory, each storing second address pointers pointing to a given number of segment modules such that each header is associated with a respective set of segment modules. Additionally, each header module includes a filename index for identifying files in a set of segments pointed to by another one of the header modules. In a write-once environment, the Nth set of segment modules includes a Nth header module identifying the segment module. The header module further includes an index to the segments in the N − 1 recorded directory module. In the latter arrangement, the segment modules are recorded substantially contemporaneously with the recording of data in the data storage device.

In another aspect of the invention, the allocation of data storage space on a data recording medium is set to a fine or small granularity for storing data signals. In a record storage disk, for example, the disk is divided into equal angular data storage sectors. The minimum allocation units for storing data will be a small number of the sectors within a given track—for example, two sectors out of twenty-three sectors in a track. On the other hand, the header modules and segment modules of the directory will be allocated only on tracks or multiple-track units such that the allocation sizes of the directory are approximately an order of magnitude greater than the allocation size for the user data. The directory recording is serial such that all directory allocated sectors are full while accommodating a large diversity of file sizes to be stored in the data area. It is also preferred that the directory be recorded beginning at an inner-radial track and proceeding radially-outwardly in a contiguous manner. Similarly, data is stored on the disk record medium beginning at an outermost radial track and proceeding contiguously radially inward toward the directory recording. One or two of the outermost tracks may be reserved for system use, such as for storing a self-booting record, a media definition which may include the type of medium and an address pointer to the certain portions of the directory. In other arrangements, the directory can be located centrally of the data storage area while still maintaining "independent" growth of the directory and data storage areas of the disk.

The foregoing and other objects, features, and advantages of the invention will be apparent from the following more particular description of preferred embodiments of the invention, as illustrated in the accompanying drawings.

BRIEF DESCRIPTION OF THE DRAWINGS

FIG. 6 is a logic diagram showing data structures usable in a controller of the FIG. 1-illustrated data storage system.

FIG. 8 is a logic diagram showing the operations of the controller of FIG. 1 used to update the FIG. 3-illustrated directory.

FIG. 10 diagrammatically illustrates an alternate sector arrangement usable with the FIG. 3-illustrated directory for accommodating alternate disk addressing arrangements.

FIG. 11 diagrammatically illustrates caching data and a current directory portion in a host computer in a manner particularly adapted for practicing the present invention.

FIG. 12 is an example of a series of data extents.

DETAILED DESCRIPTION

Figure 1:
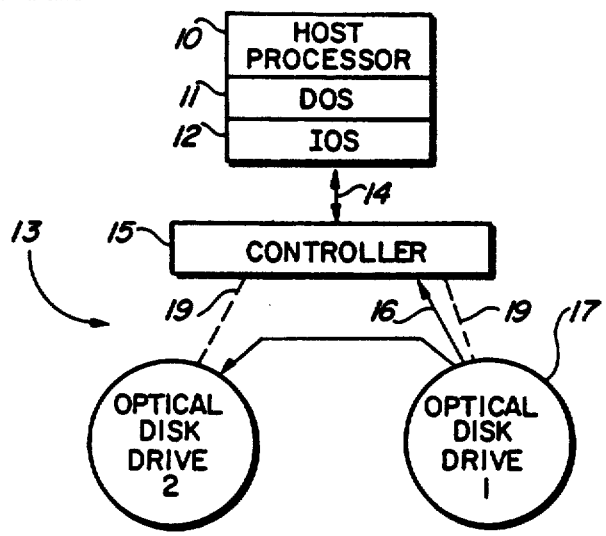
FIG. 1 is a diagram of a data storage subsystem with which the invention may be advantageously employed.

Referring now more particularly to the drawings, like numerals indicate like parts and features in the various diagrams. Referring firstly to FIG. 1, host processor 10 (such as a personal computer) includes a disk operating system DOS 11 and an input/output system IOS 12. Any programs executing in the host processor run or execute "under" DOS 11 for communications with peripheral equipment, such as disk storage apparatus, magnetic tapes, communications systems, etc. DOS 11 communicates with the peripherals through IOS 12. In some program configurations, IOS 12 may be an integral part of DOS 11. This is true in the IBM Personal Computer DOS, IOS 12 appears as BIOS which is a basic input/output system on a ROM (read-only memory) semiconductor chip. Cable 14 connects host processor 10 to data storage system 13. Storage system 13 may be constructed as set forth in Ser. No. 733,421, supra. Controller 15 of data storage system 13 includes electronic circuits which are known in the art for attaching a host processor 10 to a plurality of disk drives 17 via a daisy-chain connection 16. Controller 15, as is usual, includes a microprocessor (not shown) for executing so-called microcode which consists of programs of instruction for operating the controller 15 in a known manner. As usual, controller 15 receives instructions and data from host processor 10 and supplies data read from a disk file 17 to host processor 10 upon its request and provides subsystem 13 status information. Numeral 19 denotes two dashed lines signifying the controller 15 intimate control over disk drives 17, such as for positioning a transducer (not shown) with respect to a disk in the disk drive 17, performing rotational position sensing, controlling the reading and writing data from and onto disk, sensing status and other functions, as is practiced in the art.

In a preferred form of disk storage system 13, disk drives 17 are optical disk drives; that is, a laser (not shown) thermally excites a so-called active layer on a disk for changing its physical properties to indicate recorded information. The disk drives are further identified by the labels OD1 and OD2. An example of such an optical disk recorder is shown in U.S. Pat. No. 4,566,088 issued Jan. 21, 1986. Other examples of such devices are readily available.

Figure 2:
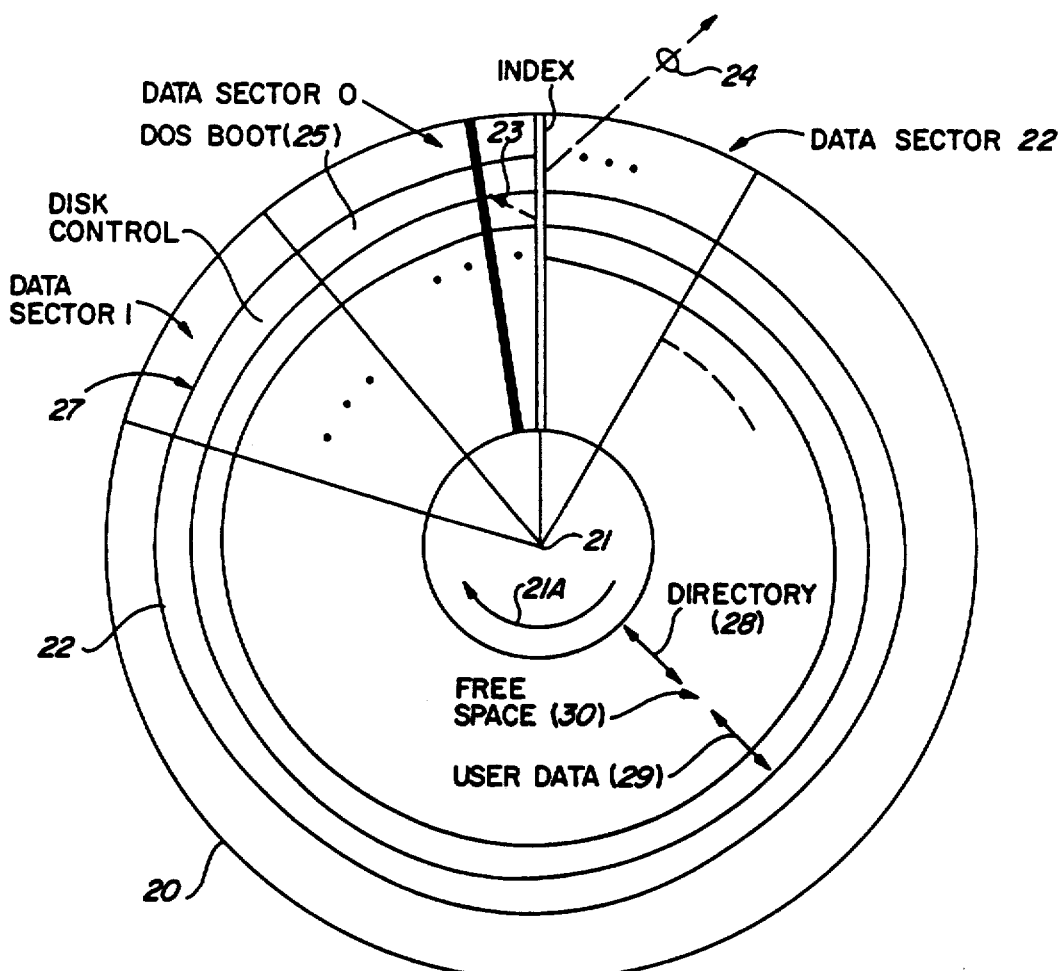
FIG. 2 is a map of a record storage disk usable in the FIG. 1-illustrated system and shows the general locations of a directory employed in accordance with the invention.

A record disk of the optical type is illustrated in FIG. 2. Optical disk 20 rotates about an axis of rotation 21 in the direction of arrow 21A. In a first preferred form, a single spiral track 22 extends from an inner-radial extremity of a recording area to a radial outward extremity. The spiral track is represented physically on the record disk 20 as a spiral groove coated by an active layer of an optically-sensible material which is changeable between an amorphous and crystalline state through laser beams, as is well known. Other forms of recording, of course, and layouts can be employed with equal efficacy for practicing the present invention. Concentric tracks may be employed rather than a single spiral track. In an early embodiment, each track or spiral circumvolution consisted of 23 angular sectors (numbered 0-22), each sector storing 1024 data bytes. Each sector is one addressable data storage location of disk 20. A small circumferential sector is optionally provided at the index 18 such that the optical transducer 24 can be moved in the direction of arrow 23 for repetitively scanning a single circumvolution of spiral track 22 as represented by circumvolution retrace arrow 23. Hereinafter, the term "track" will be used to denote either a single concentric track or a single circumvolution of a spiral track; the term "spiral track" will always be used to denote spiral track 22.

DOS boot area 25 is in sector 0 of the radially-outermost circumvolution of spiral track 22. Such DOS boot area enables any programs recorded on the record storage disk 20 to begin computing operations of host processor 10. Such booting operations are well known and not described for that reason. Sector 1 of the radially-outwardmost circumvolution stores an optical disk device control block ODDCB 27. Such control block includes self-describing data identifying the record storage disk 20, as shown in FIG. 6. Included in ODDCB 27 is a track and sector pointer to directory area 28 at the radially-inwardmost portion of the disk recording area. The directory structure will be later described. As the directory expands in a modular fashion, it grows radially outward. In contrast, user data is stored in area 29 of the data recording area of disk 20. It preferably begins with the second or third radially-outwardmost circumvolution of spiral track 22. The outermost circumvolution can be reserved for storing system information such as the boot and control areas, diagnostic data and the like. As data is recorded on record storage disk 20, the user data area 29 grows radially inwardly toward the directory area 28. Both the directory and user data recordings are respectively contiguous, i.e., fills all sectors and all tracks, as hereinafter defined. Intermediate the radial extremities of the directory and user data areas 28, 29 is free space area 30 which can receive either user data or directory data. Accordingly, any mix of user data and directory data can occur on any given record storage disk. All of the data storing sectors in free space 30 are termed "null" sectors. Any sectors containing either directory or user data cannot be again written into on the write-once device. In the event a reversible record storage disk 20 is employed, overwriting and rewriting is permitted; however, the directory and user data areas can grow in the same manner as described herein. The U.S. Pat. No. 4,575,827 incorporated by reference also shows the growth of directories and user data areas in opposing radial directions.

The head 24 is diagrammatically shown in FIG. 2 as a double-convex lens. It is to be understood that the head or transducer 24 is carried at the distal end of the so-called actuator arm which moves radially of record disk 20. Such radial movement can be rectilinear or arcuate. Generally, the transducer or head 24 is mounted for relative movement with respect to the actuator arm such that circumvolution or track switching, as represented by arrow 23, occurs in a very short time, i.e., is achieved by a so-called fine actuator (a tiltable mirror or movable objective lens is commonly employed as a fine actuator) carried on the actuator arm for moving the head 24 objective lens (not shown) for moving the laser beam, as is well known.

Figure 3:
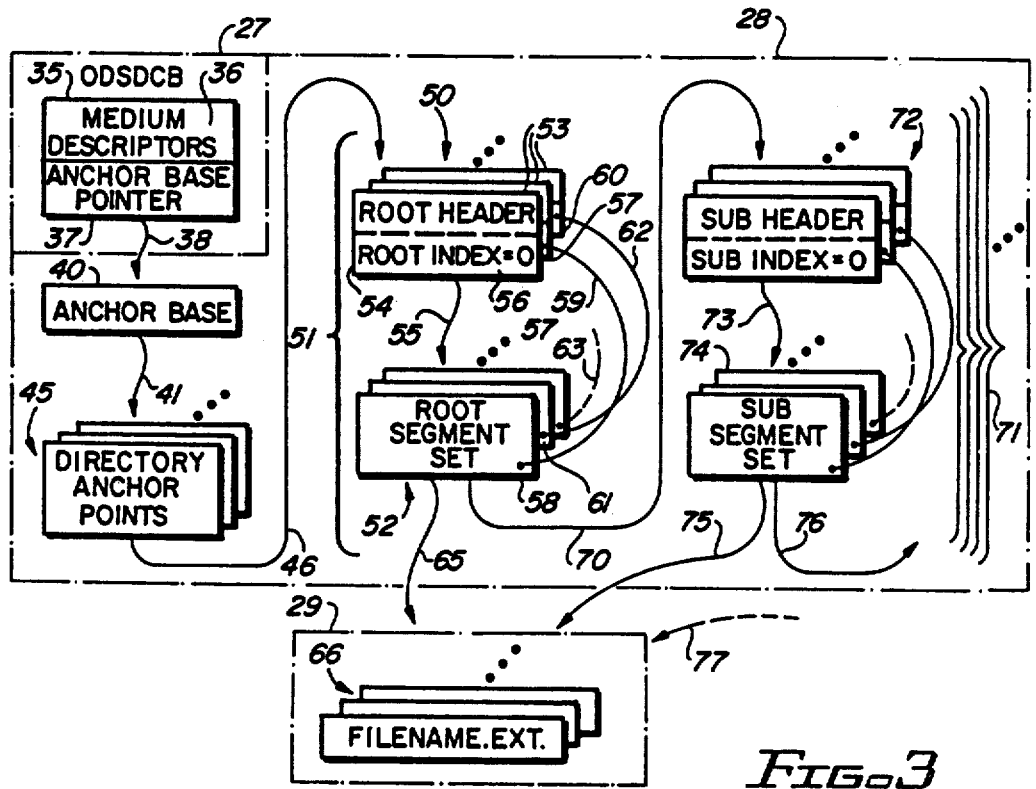
FIG. 3 is a logic diagram showing the tree structure of an exemplary directory constructed in accordance with the present invention and usable with the FIG. 1-illustrated data storage system.

FIG. 3 shows a directory constructed in accordance with the present invention. ODDCB 27 (FIG. 2) includes an optical disk self-describing control block (ODSDCB) 35. ODSDCB 35, stored by itself in sector 1 of the outermost circumvolution, includes a set of record medium or disk descriptors 36 which define the record storage disk 20 and an anchor base pointer 37 which points to a radially-inwardly disposed circumvolution of spiral track 22 which contains "anchor bases", as will be described later. ODSDCB 35 is recorded onto the disk 20 upon initialization of the disk as later described with respect to FIG. 5. Disk 20 can be reinitialized such that a plurality of data sectors contain a history of the medium descriptors. Also, ODSDCB 35 can take various forms. Combinations of changes in the data contents and the forms are termed "versions". Therefore, in the medium descriptors 36, the version of the ODSDCB is indicated. Also identified is the version of the control program that initiated the disk for the host processor 10—this is called a file system driver and forms a part of DOS 11. Portions thereof are described in FIGS. 7 through 9 for a better understanding of the present invention. It is to be understood that DOS 11 and its associated file system driver perform functions not described herein and which are not pertinent to an understanding of the present invention. Medium descriptors 36 also include a definition of the number of data sectors in each circumvolution of the spiral or in each track of a set of concentric tracks. The number of tracks per cylinder is also defined. In a first constructed embodiment of the invention, a so-called single-sided disk was employed such that each cylinder had but a single track. In a two-sided disk, each cylinder has two tracks. (A cylinder is defined as all tracks having a common radius.) Also identified in medium descriptors 36 are the number of cylinders per volume—a volume being a collection of sides of recordings of one or more record storage disks. Also included are the number of data bytes that are storable in each sector and the total number of sectors on a disk. Descriptors 36 also indicate the number of sectors that have to be included in a minimum allocation of data storage space, such as two. The media type, i.e., read only, write once, or rewritable, the track address of the anchor base for the directory are also included. ODSDCB 35 has descriptive data about the "anchor base", such as the number of tracks, etc. ODSDCB 35 points to (has stored addresses which identify track numbers) diagnostic areas on the disk—those are identified, along with a volume label and a unique medium identifier code, such as a serial number. All of such information stored in ODSDCB 35 means that the directory has to be partially created and recorded on disk 20 before ODSDCB 35 is written onto the disk.

Returning now to FIG. 3, anchor base pointer 37 points to (contains the address of the sector of disk 20 that stores the information being pointed to) anchor base 40, as indicated by arrow 38. In a constructed embodiment, the anchor base for the directory is recorded in a single circumvolution of spiral track 22. The entries in anchor base 40, one entry per data sector, point to (stores the track address) a track containing 23 entries of directory anchor pointers which point to a root directory, as described below. Accordingly, the single address in ODSDCB 35, pointer 37 identifies a single track containing the anchor bases 40. Since each track has 23 sectors, anchor bases 40 point to a maximum of 23 tracks of directory anchor pointers 45, all as indicated by arrow 41.

Each directory anchor pointer track 45 also has 23 sectors; it stores one anchor pointer in each of its sectors. Included in each anchor pointer entry is an identifier "p" (not shown) for identifying the entry as a directory anchor pointer. The anchor pointers are singly-linked by reverse pointers. Each anchor pointer entry includes a reverse pointer to a previous anchor pointer track 45. The first recorded anchor pointer track has zero as a reverse pointer. Additionally, each sector or directory anchor pointer entry includes a reverse pointer to the previous anchor pointer entry, i.e., the address of the sector storing the previously-recorded anchor pointer entry. Sector 0 in each track storing anchor pointers will have zero as a reverse entry pointer. Last, but not least, an address in each anchor pointer points to a corresponding root directory header in area 28. The address is preferably a track address. The root directory herein is comparable in a broad sense to the root directory referred to with respect to DOS for magnetic "hard disks"; the internal constructions thereof are substantially different. All of the directory header pointers in the 23 anchor pointer tracks with 23 anchor pointers per track are symbolized in FIG. 3 by the curved arrow 46.

The root directory and all of its subdirectories (all in area 28), each and respectively, employ the header segment arrangement of this invention for providing a compact, easily-scanned directory. A directory segment stores the actual entries describing a data object, data file or a subdirectory. On the other hand, a directory header 50 stores data which facilitates the search of the associated directory segments 52 by indexing and indicates the allocation of space for the directory structure. Preferably, each of the individual disk 20 sectors of the track constituting a directory segment contain a description of but one single data object, data file or subdirectory.

These two-directory constructs are used in all levels of the directory; the directory segments 52, 74 and the directory headers 50, 72 have the same logical construction in the root directory 51 and in all subdirectories 71. Within each directory segment, a maximal amount of control information is recorded relative to a specific directory entry. Such control information includes the present and past history of a data file being described. Also, within each directory header, a maximal amount of control information is recorded about a collection of directory segments, hereinafter referred to as "a set of directory segments".

An indelibly-recorded environment, also termed write once, has contained a restraint in that a present or "current" directory segment cannot be recorded concurrently with the generation of the directory segment without recording a separate directory header record for each and every directory segment. The present invention avoids this requirement. Such redundant recording in a directory results in decreased performance and accessing data through the directory is avoided by incorporating an index into the directory header record summary, i.e., control information for a collection of previously-generated directory segments, all in one previously-recorded set of directory segments.

Before going into details of the various directory constructs, the general arrangement of the root directory is described. The root directory indicated generally by numeral 51 consists of a plurality of sets of root segments 52, each summarized by a corresponding root header block 53 in header 50. Additionally, a root index 54 in each of the headers 50 index respectively the sets of root segments recorded before recording the root header 53. In a first header and index 53, the index is equal to zero, the root header portion 53 points to a first root segment set (termed a correspondence segment set), a second root header portion points respectively to a second root segment set, and so forth, all as indicated by single arrow 55. The index portion 56 of the first root header is equal to zero. Root index portion 57 of the second root header indexes the first root segment set 58, as indicated by curved line 59. In a similar manner, as indicated by curved line 62, the root index portion 60 of the third header block 50 indexes a second set of root segments 61. Numeral 63 indicates the indexing of yet other root segment sets by root header blocks other than the root header blocks identifying and describing the data of a corresponding pointed to root segment set. Details of the root headers, the root indices and the root segments are later described with respect to FIG. 4.

A first root directory segment set 52 points to actual data files stored on the disk 20, as indicated by arrow 65. Such files are stored in area 29 on disk 20 and are collectively indicated by numeral 66. Such files are preferably identified by "filename.ext" using the usual DOS nomenclature as identified in the DOS Version 2.1 Manual. Rather than pointing to a set of files 66, the entries of a root directory segment set can also identify subdirectories as indicated by arrow 70 which, in FIG. 3 points to one subdirectory in a set of a plurality of identically-constructed subdirectories, as represented by the plurality of brackets 71. Each subdirectory 71 is constructed internally in the same manner as the root directory internal construction.

Each subdirectory includes a plurality of subdirectory subheaders 72 which identify and index a plurality of subsegment sets 74, as indicated by curved arrow 73. The subdirectory segment sets 74 are constructed identically to the root segment sets, there being a plurality of such subdirectory segment sets. Arrow 75 indicates that each subdirectory segment set 74 may identify a data file 66 stored within user data area 29. Each subdirectory segment set can include entries which identify further subdirectories as indicated by arrow 76. Such further subdirectories can provide pointing to either data files 66 or to further subdirectories with the eventual identification of a data file 66 by some subdirectory segment set entry as indicated by truncated arrow 77.

In a constructed embodiment, each a time a sector is written it must be written only once, i.e., there was no update in place capability. As a result of this restriction and the requirement that a header be written upon the first segment entry being recorded, the sector on disk 20 storing the header is no longer available for further recording. Accordingly, an index for the segment entries associated with the header cannot be recorded with that header. The present invention solves that dilemma, as will be apparent from a continued reading of the description. This technique can also be employed with the magnetooptic recording which requires an erasure of the entire sector before data can be recorded. The invention avoids the need to rewrite the sector and the requirement of two or more rotations to overwrite the directory (one rotation to erase and one rotation to rewrite).

An early arrangement of the directory in area 28 of disk 20 defined a diagnostic or reference track as the radially-innermost convolution of spiral track 22. The next two radially-outward tracks (2nd and 3rd radially-inwardmost tracks) contained the root directory segment 58. Once the root directory segment is allocated, then the first root directory header can be allocated to another track and written. This root header track is allocated and written into the fourth track from the innermost-radial track. Then, a first directory anchor pointer 45 is written into a next radially-outermost or fifth track followed by recording the anchor base 40 in the next or sixth radially-outward track. Following this recording, subdirectories and additional root segment sets and root headers can be allocated and written into tracks having increasing radial locations on disk 20. The anchor base and the anchor pointers 45 are updated accordingly.

Figure 4:
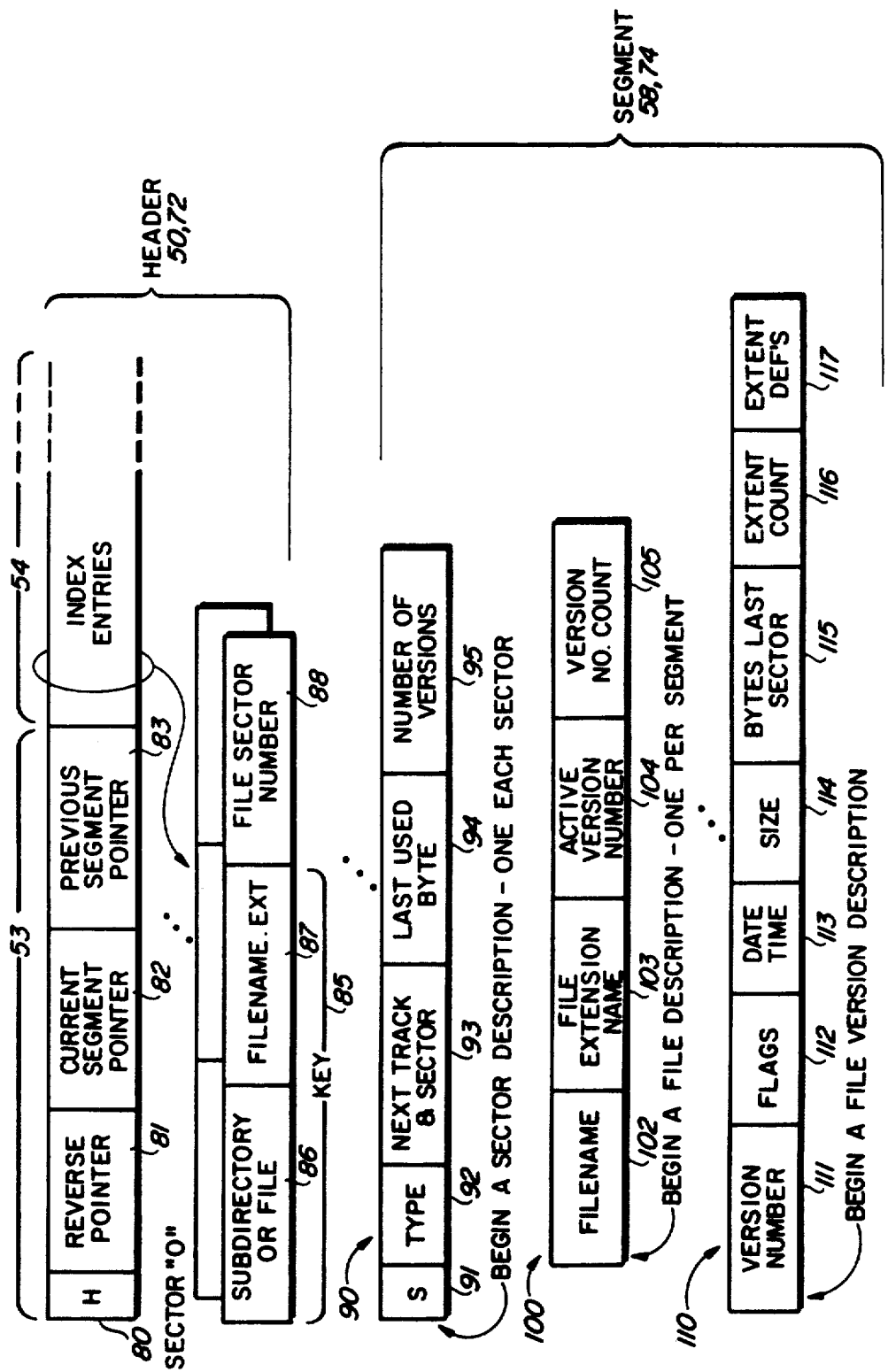
FIG. 4 illustrates data structures usable for the directory illustrated in FIG. 3.

Referring now to FIG. 4, the header and segment structures of the directory of this application are described. Each directory and subdirectory has its own collection of headers and segments. Each directory header not only points to or addresses the current directory segment which is the last segment being updated, as described later, but a summary record or index for the immediately-previously-recorded directory segment set is also recorded as a part of the header. Each header contains a pointer to the remainder of the current directory segment records which are currently being processed. Each header also stores summary information relative to previous collections of directory segment records. In an early embodiment of the invention, each directory header contained address pointers to 22 directory segment entries. The first recorded directory header in any directory or subdirectory pointed to the first directory segment set and did not contain an index. A second and subsequent directory header pointed to respective directory segment sets and each contained summary information or indices for the 42 directory segment entries (stored in two tracks—two sectors are defined as spaces to receive directory data when one of the sectors is not recordable) defined in the immediately-preceding recorded directory header entry.

Each of the directory headers 50, 72 included a header portion 53 and an index portion 54. Each header portion 53 included identifier field H 80 which identified the data structure as a directory header entry. Remember there is only one header per sector of the optical storage disk 20. Reverse pointer 81 is the address pointer to the previous header in the reverse-singly-linked list. Each reverse pointer 81 includes a track and sector address except in the first header entry in a directory header the reverse pointer 81 is zero. In the constructed embodiment, only one track is used for each header, no limitation thereto intended. A track address is required to expand the application of this invention to accommodate multiple-track directory headers.

Current segment pointer 82 contained the track address of the directory segment sets 58, 74 identified by the current directory header. Only the track address is provided. Previous segment pointer 83 identified the highest numbered track associated with and identified by the immediately-previously-recorded directory header for indicating the track address of those segments in such corresponding segment set. This entry 83 eliminated the need to read the current segment pointer 82 of the immediately-preceding directory header to find the track address pointer for the segment set indexed by the current directory header. Following the header portion 53, the index entry portion 54 identified all of the segments in the segment set 52 associated with the immediately-previously-recorded directory header and as pointed to by previous segment pointer 83. Up to 42 index entries, one for each directory segment in the immediately-preceding segment set were recorded in each index entry portion 54. (Each entry is preferably a fixed length.) Each index entry included a subdirectory or file identifier 86. The name of the subdirectory or file is left justified in the entry area with the unused portion being padded with binary zeros or other null-indicating patterns.

The index field 87 contained the "filename.ext" which is a multiple-byte file extension name left justified within field 87. The unused portion of field 87 is padded with null indicating patterns. The fields 86 and 87 constitute index key 85 enabling a quick scan of the directory headers 50 for identifying whether or not there is a data search hit or miss in the directory segments 58, 74 associated with the respective immediately-previously-recorded directory header. Finally, each index entry 54 included a file sector number 88 which is the "relative sector" pointer for the file. The relative sector pointer indicates the number of sectors displaced from the first sector in the segment set being indexed, i.e., which relative sector stores a segment entry identified by fields 86 and 87 of the key 85.

Each directory segment 52, 74 consisted of a description of a particular file or subdirectory. The file is described by a file descriptor record 100 (FIG. 4) consisting of the filename 102, attributes, timestamp, datestamp and a definition of file extents, as later described. Minimal space is consumed by having each file extent defined by a relative sector number 88 followed by a count of the number of contiguous sectors following the relative sector number which are occupied by the file extent. Each file extent (later described) used its own relative sector number. The file descriptor portion of a directory segment described the file or a subdirectory. This descriptor was divided into three sections: 1) general header record for each sector of a directory entry; 2) common file header which described the control information common to all versions of the file being described; and 3) a file version header which merely described a version of the file. In the directory segment, the general, common file and file version headers were written contiguously on disk 20. The latest-created (current) directory segment identified all versions of a described data file. This description means that the previously-recorded directory segment is demarked (erased).

Since each directory segment contains the history of a file, search time for a given file version is reduced.

It was also desired to have one directory segment stored in one sector; however, as a file becomes active, and the segment gets larger, then the segment could spill over into contiguous disk sectors. To accommodate the enlarged (occupy more than one section) logical directory segments, there is a general header in each of the sectors storing a directory segment.

Referring again to FIG. 4, the general directory header 90 includes an initial identifier field 91 which contains the alphabetic character "S". Type field 92 indicates the type of information that is recorded in the sector headed by general header 90. For example, if the logical directory segment can be stored in a single sector, then a first indicator identified the sector as a single directory segment block. On the other hand, if more than one sector was required to store a directory segment, then the first sector had a first identifier for indicating it is the first sector of a plurality of sectors storing the directory segment. All intermediate sectors had a third indicator in type field 92 indicating that the sector is a middle one of a plurality of sectors storing a single directory segment. The last sector for the segment was identified by a fourth indicator in type field 92 for indicating it was the last sector of a plurality of sectors storing information on a single directory segment. Field 93 contained a track and sector address of the next sector storing the directory segment information. Usually this address identified the next sector to be scanned in a given track on the storage disk 20. Since some sectors may be demarked because of media errors, the track and sector address in field 93 always pointed to the next good sector which stored directory segment information. Field 94 identified the circumferential or byte position within a sector that stored the last byte recorded in a sector. This last byte indicator is a relative number modulus the number of bytes storable in a given sector It is included for purposes of integrity and length indication. Field 95 stored the number of file version headers stored within a given sector of disk 20. The version header 110 is described later.

The common file header 100 appeared only in the first sector that began storage of each directory segment. Common file header 100 was recorded in the first sector storing a directory segment immediately adjacent to general header 90. General header 90 had a fixed length, therefore the circumferential position of the recorded information within the first sector identified common file header 100 to begin a file description. Field 102 contained the "filename" of the file being described in the directory segment. A filename can have a file extension name (multiple bytes) which was included in field 103. Field 104 stored the version number of the active file version. When field 104 was zero, then there was no active version of this file. Whether or not there was an active version was determined by the user who programmed the host processor 10. Field 105 contained a count indicating the number of versions in this file. The host processor programming arbitrarily defined or determined when a new version is created. In many instances, the versions occur chronologically, such as weekly, as for various versions of a payroll file. Common file header 100 also has a fixed length and occurs only in the first sector storing a directory segment 58 or 74. At the end of common header 100, begin a series of file version descriptions 110. There is one file version description for each file version recorded on disk 20. Each file version description 110 also had a fixed length so that the rotational position on disk 20 or byte position in a sector identified the beginning of each file version description 110. File version description 110 included field 111 containing the version number being described. Field 111 contained two bytes for identifying up to 65,535 (64K) versions of a file. For identifying a larger number of versions field 111 can be expanded; however, for each version of a directory the field length must be constant for enabling location of fields by circumferential or byte positions. When such an expansion is desired, all file version descriptions 110 must be also expanded. Field 112 contained a set of attribute flags defining the attributes of the given file version. Such attributes include the version as being a read only, if it is a hidden file as used in DOS 2.1 supra, it is a system file, it is a volume label, a subdirectory, archival file or the like. Field 113 contained the date and time (timestamp) the version was created. Such date and time indicia are in accordance with DOS 2.1 date and time formats. Size field 114 identified the number of bytes contained in the file version being described. It is preferred that the size indicia have the least-significant digits read first. Field 115 indicated the number of bytes in the file version stored in the last sector having bytes stored from the file version. In other words, five sectors may store the file. The fifth sector may not be completely filled. The number of bytes in that last sector was indicated in field 115. Extent count field 116 indicated the number of extents in this given file version. One file extent is that portion of a file stored in contiguous sectors of disk 20. The extent definitions (later described) were contained in field 117. The total length of the file version description 110 was determined by the fixed length of fields 111-116 plus the number of fixed-length extent definitions 117. In this manner, the rotational or byte position of the disk 20 identified the beginning of each file version description 110 contained in a directory segment 58. The extent definition is a fixed-length field which identified the relative sector number in a file of the extent, i.e., where the extent begins and the number of contiguous sectors constituting the extent.

The term "extent" will be more fully described later with respect to the FIG. 6 showing of the file extent map control block. Briefly, a file may have differing records recorded on disk 20 at different times. Each set of contiguous records that are recorded constitute one file extent; for example, if records 5 through 26 were recorded first, those records constitute a single extent. Records 1 through 4 being recorded after records 5 through 26 can constitute a second extent. Since disk 20 is indelibly recorded and the user data is recorded contiguously at decreasing radial positions, irrespective of the logical relationship of the data, the extent definition and management form an important part of this directory structure.

Before any recording operations can occur, the disk has to be initialized for setting up a root directory and the various anchor bases and anchors as show in FIG. 3. This initialization is described by referring to both FIGS. 3 and 5. It is assumed that disk 20 has been suitably mounted on a disk player/recorder and that the host processor 10 has identified the disk 20 as being mounted on one of the disk drives 17. Host processor 10 from within DOS 11 makes a subfunction call (activates) a program stored within host processor 10 to perform the machine operations shown in FIG. 5. This program call is indicated at 120 by the acronym INITOD. Numeral 121 indicates the parameter data required for disk 20 initialization. It includes the drive 17 ID or address, as being OD1 or OD2, system's options (SYSOPT) which are beyond the scope of the present description, and a disk label, following DOS 2.1 protocol. In addition to establishing a directory as shown in FIG. 3 on disk 20, diagnostic areas are also established. DOS boot 25 of data sector 0 in the radially-outermost track is not written at this time. After host processor 10 has called the INITOD program, it resets the return code R to zero, at step 122. Then at step 123, it reads track 1 sector 1 (T1S1) to determine whether or not ODSDCB 35 has been recorded; i.e., if disk 20 has already been initialized. At step 124 host processor 10 examines the results of the READ conducted in step 123. If this sector is not equal to zero, then the return code is set to one at step 125 and control of host processor 10 is returned to the calling program at return point 126. When T1S1 is null or zero, at step 124, then host processor 10 builds a control block called ODDCB—optical disk device control block 128 which is detailed and described later with respect to FIG. 6. The informational contents of ODDCB 128 are largely recorded into ODSDCB 35 as will become apparent. ODDCB 128 resides in host processor 10 in its main memory (not shown). A setup for diagnostically testing optical disk 20 begins at step 130 wherein a test pattern (not shown) suitable for testing optical disks for diverse operational parameters is brought into host processor 10 main memory in a so-called format area (not shown). Host processor 10 at step 131 allocates and formats the test area on disk 20. In an early embodiment of the invention, such a diagnostic test pattern was recorded in the radially-innermost track of optical disk 20, i.e., radially inward of directory area 28 (FIG. 2). Included in step 131 is a recording of a test pattern onto that radially-inward most track. At step 132, host processor 10 examines the return code from that recording operation. If the return code is nonzero, i.e., an error condition occurred, then initialization cannot continue. Accordingly, host processor 10 at step 133 sets its return code R to one and returns to the calling DOS 11 function. Note that the return code R in step 132 is from the recording process and is not the same as the return code in step 133. Assuming that the diagnostic test pattern was successfully recorded in the radially-inwardmost track of disk 20, then host processor 10 at step 134 identifies which track the diagnostic test pattern was recorded upon within ODDCB 128 (in main memory of host processor 10). At step 135 the format area is cleared to zero for erasing the test pattern.

From step 135, host processor 10 proceeds to build a root directory. At step 140 a root directory segment is first built. The root directory segment includes a two-track allocation immediately-radially adjacent the diagnostic track recorded in step 134. Note that the allocation of the directory is from the bottom up, i.e., directory segment through root anchors. The reason for this procedure is that the higher order directory elements contain pointers to the lower directory elements. Since disk 20 may have media imperfections, it is not known where the lower elements will be recorded; therefore, the higher directory elements are recorded last. At this time, no directory data has been recorded on disk 20. Host processor 10 now accesses the two tracks radially adjacent the previously-recorded diagnostic track to see if such tracks are allocatable. If both tracks are allocatable, this fact is noted in main memory with the track pointers to be recorded later on disk 20, as will become apparent. Next at step 141 a root directory header 50 is built in the format area of main memory which includes the address pointers to the just-allocated root directory segment 58. This allocation is achieved by writing in main memory the current segment pointer 82 of the root header portion 53 (FIG. 4). The reverse pointer 81 and previous segment pointer are zero since it is the first directory header being built. A single track of disk 20 is allocated for directory header 53 which is contiguous with the just-allocated two tracks for the first directory segments to be used in the root directory.

Now, three tracks have been allocated for the directory—two for the first directory segment and one for the first directory header. As of now, nothing has been recorded on disk 20 as a directory. Then in step 142 host processor 10 accesses ODDCB 128 (in main memory of the host processor 10) to set the header address to the track address just allocated in step 141. Following setting up ODDCB 128 for making the just-allocated directory header and segment addressable, host processor 10 at step 143, builds a directory anchor pointer which contains the track address for the just-allocated root directory header. This build program process includes putting the header track address into the anchor pointer in main memory which consists of an ID field set to P, a back pointer set to zero (it is the first anchor pointer being built) and the track address of the root directory header. Also, the next radially-outwardmost available track is allocated for the anchor pointer. Still nothing has been recorded on the disk 20.

Host processor 10 at step 144 accesses ODDCB 128 (in main memory of host processor 10) and stores the just-allocated track address in the later-described field of the device control block 128. Next at step 145, host processor 10 builds anchor base 40 in main memory and allocates the next available radially more-outward track of disk 20 for the anchor base. The first anchor base entry includes an A identifier field, a backpointer to the previous anchor base element which is set to zero since it is the first anchor base element, and the track address of the directory anchor pointer (just allocated in step 143). Once these fields are set up for anchor base 40, host processor 10 at step 146 accesses ODDCB 128 and stores the track address for anchor base 40 in that control block in main memory. All of track address information for accessing the just-allocated directory header track, the two segment tracks, anchor pointer track and anchor base track are now available to host processor 10 such that ODSDCB 35 finally can be recorded in track 1, sector 1 of disk 20. Accordingly, host processor 10 at step 147 builds ODSDCB 35 in main memory and records it in the format shown in FIG. 6 in track 1, sector 1 of disk 20. Prior to recording ODSDCB 35, disk 20 may either contain no signals whatsoever or may be storing diagnostic signals in a reserved area (not described). Following recording ODSDCB 35, additional housekeeping machine operations are performed as indicated by numeral 148. Then, the management and control of host processor 10 is returned to DOS 11 to that function which called the INITOD set of machine operations.

FIG. 6 illustrates the FEMCB 155 control block for identifying file extents as well as device control block ODDCB 128. FEMCB 155 is stored only in the main memory of host processor 10, the extent definitions 117 of file version descriptor header 110 (FIG. 4) are derived from FEMCB 155. There is one FEMCB 155 for each data file that is opened in host processor 10 for data processing operations, either as an input or an output file. Several fields of FEMCB 155 are illustrated for purposes of understanding the present invention. FEMID field 156 identifies that portion of main memory as being the FEMCB. Addressability of FEMCB 155 is established at a "higher" DOS function level using known DOS techniques and hence is not described herein. Field 157 U indicates whether the file has been updated during the open status. A binary one indicates a file update. Such an indicator is used when the open file is closed to indicate whether or not the processed file in host processor 10 is to be recorded on disk 20. Field DIR ADDR 158 stores the track and sector address for the directory segment 58 identifying the identified open file. Field 159 contains the attribute flags for the open file and for the file version corresponding to field 112 of the FIG. 4 directory segment 58 illustration. DR field 160 contains the drive (DR) address OD1 or OD2 on which optical disk 20 is mounted. Field 161 stores the filename of the open file which for purposes of brevity includes the filename extension corresponding to fields 102, 103 of common file header 100 (FIG. 4). VER field 162 stores the file number version (VER) of the open file. This number corresponds to the version number in field 111 of the version of filename that is currently being processed by host processor 10. Opens field 165 indicates the number of programs in host processor 10 that have opened this file. Each time the file is opened, opens field 165 is incremented by one. Similarly, when one of the programs closes the file, then the number of opens is reduced by one. Field VCNT 166 stores the version count (VCNT) for the highest number version of the open file identified in the directory 28. The file version being processed need not be the highest numbered version. Field RELS 167 identifies the high relative sector (RELS) for the open file which, of course, identifies the extent having the latest recorded records of all of the extents constituting the file. Field MAPADDR 168 points to the address in host processor main memory which marks the beginning of the extent map (MAPADDR) for the particular file version. Each extent map consists of fields 116 and 117 of file version description 110. Each file has a file version description for each of its file versions. The extent map relative byte address MAPADDR indicates the number of bytes that the extent map is displaced from fields 91. Note that a directory segment 58 may extend over a plurality of disk 20 sectors and hence the relative byte position in MAPADDR field 168 may be greater than the number of bytes stored in a sector. The physical location of the beginning of extent count field 116 on disk 20 within a directory segment 50 in a particular file version description 110 is the offset constituting the relative number in field 167 divided by the number of bytes in a sector. The remainder indicates the byte offset within the sector storing the file version description 110 and the quotient indicates the displacement from field 91 as a number of relative sectors of the directory segment 58 entry, less one. NBR field 169 indicates the number (NBR) of extent definitions; this is the same number as stored in extent count field 116 as recorded on disk 20. The EXT field 170 contains the information stored in extent (EXT) definition field 117. Numeral 171 indicates an ellipsis signifying that FEMCB 155 contains other information pertinent to DOS but not pertinent to an understanding of the present invention. Such information can include file size, date and time, past information, subdirectory information, and the like.

For a better understanding of the extents and their respective relationship to the directory structure, an example is given. The assumption is that the record size in filename is 256 bytes. The file is created by first recording record numbered 1 through 9 and 16 through 20. Refer to Table A below in reading the example. Version 1 of the extent map, i.e., fields 116 and 117 set the extent count 116 to three. The first extent definition 117 is for records 1 through 9 with the number of sectors occupied being the sector size divided by 256, rounded to the next higher number. If record 9 does not end at the end of a sector, then the remainder of that sector is nulled to all zeros. The second extent is an empty extent. It is defined in a second entry of extent definition 117 finds the number of sectors equal to sector size divided by 256 (times 5) rounded to the next higher integer. This number represents the records numbered 10 to 14 which have not yet been created or at least not yet recorded. The third extent definition 117 finds the number of sectors set to 256 times 5 divided by the sector size, rounded to the next higher integer. The relative sector entry is entered only for the first and third occupied extents. Such relative sector numbers are calculated whether or not the second or intermediate extent does in fact represent stored information. For example, if the first and second extents require three sectors for storing the information identified in filename, then the relative sector number for the third extent is equal to 4. The relative sector number for the intermediate extent is set to null because it has no information-storing records. Null, in this case, can be all ones. The relative sector number for the first extent is equal to zero. There may be additional relative numbers added to the numbers calculated above depending upon the addressing scheme. Following the creation of filename versions and recording them on disk 20, which results in three file version headers 110 being created, which are contiguously recorded after common file header 100 which in turn is recorded immediately after general header 90. The filename is then updated. Assume that records 13 and 14 are recorded as well as records 3 and 19 being updated. As a result of this update, there will be seven file version headers 110 created as set forth in Table A below:

TABLE A

| STATUS AFTER ONE FILE UPDATE | | |
|---|---|---|
| FIELD | NAME OF FIELD | CONTENTS |
| (1) ORIGINAL FILE VERSION DESCRIPTION - | | |

TABLE A-continued

STATUS AFTER ONE FILE UPDATE

| FIELD | NAME OF FIELD | CONTENTS |
|---|---|---|
| | SELECTED FIELDS | |
| 111 | VERSION NUMBER | 2 |
| 116 | EXTENT COUNT | 3 |
| 117-1 | EXTENT DEFINITION #1 (for records 1-10) | SECTOR = XXX00 #SECTORS = 5 |
| 117-2 | EXTENT DEFINITION #2 (for records 11-14) | SECTOR = FFFFFF #SECTORS = 2 |
| 117-3 | EXTENT DEFINITION #3 (for records 15-20) | SECTOR = XXX006 #SECTORS = 3 |
| (2) UPDATED FILE VERSION DESCRIPTION - SELECTED FIELDS | | |
| 111 | VERSION NUMBER | 1 |
| 116 | EXTENT COUNT | 7 |
| 117-1 | EXTENT DEFINITION #1U (for records 1 and 2) | SECTOR = XXX000 #SECTORS = 1 |
| 117-2 | EXTENT DEFINITION #2U (for updated records 3 plus 4) | SECTOR = XXX008 #SECTORS = 1 |
| 117-3 | EXTENT DEFINITION #3U (for records 5-10) | SECTOR = XXX002 #SECTORS = 3 |
| 117-4 | EXTENT DEFINITION #4U (for records 11, 12) | SECTION = FFFFFF #SECTORS = 1 |
| 117-5 | EXTENT DEFINITION #5U (for records 13, 14 new) | SECTOR = XXX009 #SECTORS = 1 |
| 117-6 | EXTENT DEFINITION #6U (for records 15-18) | SECTOR = XXX006 #SECTORS = 2 |
| 117-7 | EXTENT DEFINITION #7U (for records 19, 20) | SECTOR = XXX00A |

In the above table # means number, FFFFFF means all ones (logical, no data is recorded so all ones (1s) mean null), XXX means arbitrary relative address numbers, and the counting of sectors is done in hexadecimal; A-F being the equivalents of decimal numbers 10-15, respectively. In the directory header, each updated file version description 110 is recorded in the directory segment immediately following the common file header 100 and the original file description header 110 is recorded following the updated file version description such that the latest file version description 110 is the first one encountered when reading a directory segment (LIFO—last in first out storage).

Table A is constructed for a filename having a record size of 256 bytes with a sector size of 512 bytes such that in the data recording area 29, two records occupy a given single sector. The records are allocated to the sectors as if all of the records were filled with data. Accordingly, in the original file version description of Table A, extent definition #1 is for records 1 through 10; actually, records 1 through 9 only exist, however, five full sectors are allocated as if records 1 through 10 were full. Also, five sectors are used in disk 20. Extent definition #2 in the original file version header is for yet-to-be-created records 11 through 14, preserving two sectors with the relative sector being equal to FFFFFF. The "allocation" for records 11-14 is only for purposes of managing the directory; in fact, no sectors on disk 20 are used. In a similar manner, extent definition #3 is for records 16 through 20, however, three sectors of data area 29 are "allocated" and used on disk 20 with the first sector of data area 29 identified by extent definition #3 contains only record 16 leaving an "allocated" space for a record 15 which can be later recorded such that all record positions in filename are preserved to accommodate the file when it becomes completely filled.

In Table A, the updated file version description, as a result of one recording operation, becomes version #2 while the original file version description becomes version #3. In the original file version, there are three extents while in the second or updated file version there are seven extents. Extent definition #1U becomes a separate extent because record 3 was updated in the original extent of records 1 through 9. Original record 4 joins updated record 3 in the second extent which has a relative offset of 008, i.e., original record 4 is rerecorded into the new extent leaving another copy of original record 4 within the extent definition #1 of the original file version. Extent definition #3U is for original records 5 through 10 plus the allocation space for yet-to-be-received record 10. It's relative sector now becomes #2 since the sector originally storing records 3 and 4 is no longer in the most recent or current file version. In definition #4U, taken from the original extent definition #2 for records 11, 12 not yet received, keep the relative sector address as FFFFFF with one sector being logically allocated only within directory 28 for the two yet-to-be recorded records. The new extent definition #5U identifies new records 13 and 14 as a separate extent having an offset of 9, i.e., are recorded after the data defined by definition #2U (updating record 3 caused that new extent) with one sector of data area 29 being required for storage. Extent definition #6U for records 15 through 18 keeps the same relative sector number as extent definition #3 in the original version. However, the number of sectors is reduced by one because record 20 was updated. Since record 20 is updated it carries with it original record 19 to create a new extent definition #7U having an offset of 00A (decimal 10) having one data area 29 sector identified by it.

From the above definitions in Table A, it is seen that the physical recording of various records during an update results in physical fragmentation of the data on record disk 20, however, with the file version header logically tying all records in numerical order as a contiguous, logical file whether or not the records are in fact recorded. In this sense, the file version description also serves as an allocation map.

The file recorded on disk 20, as represented in Table A, was recorded in two time-displaced recording operations. The term "recording operation" means all recording accomplished during a given "write open" of the file by DOS. In a practical sense, the "recording operation" may consist of several recording sessions conducted during the single "write open" period (file is opened for writing). Therefore, the records as actually recorded on disk 20 in version 1 (original file version) consisting of records 1-9 recorded in five contiguous sectors and records 15 through 20 (five records recorded in three contiguous sectors) can be recorded in eight contiguous sectors on disk 20. If two recording sessions were used during the single "write open", the records 15 through 20 could be recorded in three contiguous sectors physically separated from the five contiguous sectors storing records 1 through 9; records 15 through 20 could have been recorded before records 1 through 9 as well.

Irrespective of such recording session sequences within a single "write open", all the records recorded during as single "write open" are treated in the directory as being recorded during a single recording operation. All records recorded during such one write open are sorted in the directory segment by record number regardless of physical recording locations. Similarly, the second "write open" represented in Table A, may consist of several time-displaced recording sessions.

Only the file versions as identified in the illustrative example as being generated during successive "write opens" result in changing the extent definition; no extent definitions are changed until the write open file is closed.

Returning now to FIG. 6, ODDCB 128 as stored in main memory of host processor 10 is detailed and will be compared with ODSDCB 35. ODDCB 128 has a first field 176 DCBID (device control block identification) which identifies control block 128 as ODDCB. The address of field 176 has the beginning address for ODDCB 128 as assumed by the previous description was generated and stored in DOS 11. DR field 177 identifies which optical disk drive 17 is mounting optical disk 20. Medium field 178 contains the description of disk 20 as mounted in the identified drive 17. Information stored in medium field 178 is obtained from reading ODSDCB 35 for the particular disk 20 that was mounted. ANCH (anchor) field 179 contains the track address of the anchor base 40 as read from ODSDCB 35 of disk 20. From medium field 178, host processor 10 can determine the total number of sectors on disk 20 that are available for allocation.

Label field 180 contains the label or name of the optical disk 20 as a data volume and was read from ODSDCB 35. "Last data" field 185 stores the track address and the sector address within such track that was last used for storing data in data area 29. Such information can be obtained from a later-described find space operation shown in FIG. 9. Opens field 186 indicates the number of opens for the file version by computer programs being executed in host processor 10. This number corresponds to the number of "users" that are actively involved with the particular file version. The term "users" means programs. Last DIR field 187 contains the track address of the last-recorded directory anchor pointer 45. The anchor pointer is found by reading anchor base 40 on disk 20 as pointed to by the anchor base pointer 37 (FIG. 3). Root HDR field 188 stores in main memory the track address of the root directory header 50 used in connection with the current file version being processed. Path field 189 contains the DOS path name for accessing the file version being processed. Path HDRS field 190 contains the track addresses of the subdirectory headers specified by the path name stored in path field 189. NSD (number of subdirectories) field 191 stores a count of a subdirectories represented in path field 189. New field 192 stores the track address of a directory header track not yet reflected in a higher level directory entry for the current directory. This means, for example, a subheader 72 may not yet be pointed to by a root segment 58; hence, is not yet addressable by information recorded on disk 20. This field content is a reminder to the program and DOS 11 to update the root segment for identifying the subheader. This same rule applies for root headers 50 wherein the directory anchor pointers 45 were not updated to reflect the construction of a new or additional root header 53. In summary, ODSDCB 35 contains only medium-descriptor information while ODDCB 128 not only contains that information but other functional information incident to ensuring appropriate and accurate updating of directory 28 on the closure of any open file, i.e., when the opens field 186 equals zero. Numeral 193 identifies an ellipsis indicating that ODDCB may contain other fields incidental for file management control which are not pertinent to an understanding of the present invention.

Figure 7:
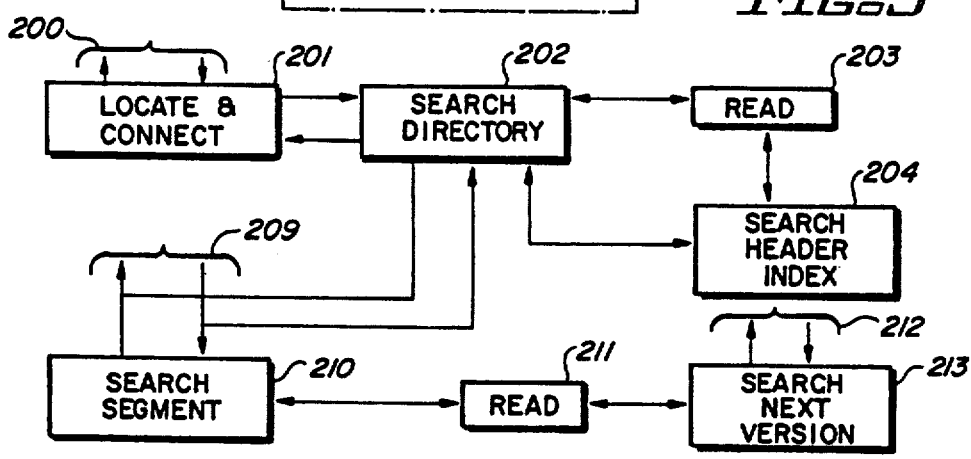
FIG. 7 is a logic diagram showing operations of the controller of FIG. 1 in retrieving directory information stored in the FIG. 3-illustrated directory.
Figure 9:
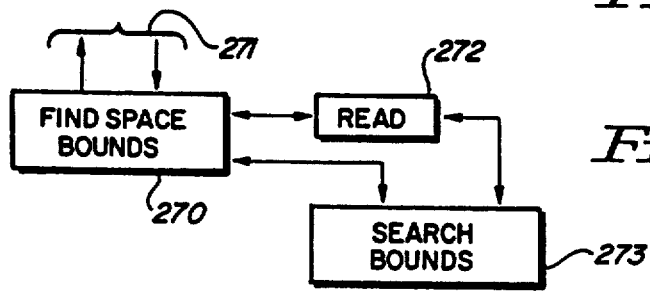
FIG. 9 is a logic diagram illustrating identification of the data recording extremities on the FIG. 2-illustrated disk for operations to be conducted by the controller of FIG. 1.

In FIGS. 7, 8 and 9 lines connecting blocks represent program calls, data transfers and the like between programming represented by boxes connected to the lines.

FIG. 7 illustrates, in simplified form, the host processor 10 machine operations used to access information contained in a directory 28 recorded on a disk 20. Once a disk 20 is mounted onto a drive 17, host processor 10 then accesses the disk 20 for determining the location of the directory and obtaining information therefrom by first reading ODSDCB 35 and then based upon the needs defined by DOS 11, the directory headers and segments recorded on disk 20. Numeral 200 indicates activation by DOS 11 of locate and connect machine operations 201. These locate and connect operations locate a given directory 28 header/segment for updating ODDCB 128 in main memory to build a specified directory path received from DOS 11, i.e. the current directory path for accessing directory 28. Machine operations 201 include setting a number of names indicator 19' in main memory to the number of names (names of subdirectories and filenames) contained in the specified directory path received from DOS 11. Then a loop of machine operations is performed for finding all of the names (directory headers, filenames, and so forth) in directory 28 that were specified by DOS 11. For each specified name, search directory operation 202 is activated to find that name in the directory 28.

The search directory operation 202 scans directory 28 for finding a requested subdirectory or filename. Firstly, the last created root directory segment 58 and its identified subdirectories 71 are searched for the file/-path arguments. If no hit is made, then the search extends to the header indices 57, 60. The search extension first scans the indices in the root directory, such as indices 57 and 60. If a subdirectory is identified in the index entry 54 (FIG. 4) as in field 86 or a filename.ext in field 87 for the specified name, then the directory segment 52 corresponding to the index entry is then scanned for identifying the physical location on disk 20 of the subdirectory or filename respectively in directory 28 or user data area 29. Remember, search directory operation 202 is activated once for each name contained in the path. Since scanning directories is a well-known technique, details of such scanning are not further described except to say that the index scan begins in the root directory with index 57 (remember index 56 is set equal to zero), through all of the indices plus the last root segment which is not yet been filled its allocated two tracks. For each identified subdirectory, an identical search is conducted until all of the actual physical addresses corresponding to all of the logical path names have been identified. When these search operations are completed, the directory is logically connected to DOS 11 using the path identification now stored in ODDCB 128 in the fields described with respect to FIG. 6. The search directory operation also includes a read operation 203 for reading the directory indices in the root and subdirectory headers as well as searching the header indices at step 204.

The final search portion 210 searches the last directory segment (probably not yet filled). This search can also be called as a subfunction of DOS 11 as indicated by numeral 209 or is called as a subfunction from search directory 202 upon completion of searching a header index in operation 204. The search segment machine operations 210 search a directory segment located at a specified track address within directory area 28. For a directory segment, the specified track is a radially-inwardmost track of the two tracks allocated for the directory segment. The machine operations 210 include a read operation 211 for reading the two addressed segment tracks by reading each sector on the disk 20 in sequence for finding the appropriate filename in field 102 or file extension name 103. Field 102 can also identify a subdirectory.

The search next version operations 213 are called as a DOS subfunction from DOS 11 as indicated by numeral 212. The search next version 213 operates and searches a directory entry (header and segment) for information about a subsequent or next version of a file. Input parameters from DOS 11 include identification of the last file version number that has been found together with the track and sector addresses of the file directory description 110 corresponding to the file version number last found as being stored data area 29. Remember that the version numbers start with numeral 1 for the first-recorded or earliest file version; that last version has been found when the search next version 213 is activated. Host processor 10 in conducting machine operations 213 first locates the directory segment containing the file version descriptions 110 (remember older versions of the directory are erased or demarked when a file is updated). Then all of the file version descriptions are scanned to find the file version which is one less than the DOS specified file version. The informational content of the file version description in fields 111-117 (FIG. 4) corresponding to that next file version number (next older file version, for example) is supplied to the host processor 10 (main memory). If the last processed or last found file version is the last one in the directory segment describing the filename, then that information is returned to host processor 10. Such scanning and supplying such information is a relatively simple machine operation to implement and is not detailed further for that reason. The search directory operations 202 can also be directly activated from DOS 11.

Referring next to FIG. 8, the machine operations in host processor 10 or initiated by host processor 10 to drive 17 for updating a directory 28 are illustrated in simplified form. These machine operations generate new directory segment 58 information and new directory header 50 information. In a subdirectory arrangement, headers and segments may be generated either at the root or subdirectory levels or for a plurality of directory levels, depending upon the character and extent of the updates. The updated information is then recorded on disk 20 in directory area 28. Each time a file is updated, the version number of the various versions are all updated to reflect that the current or last recorded version is version N; the highest version number.

If a higher level directory than the subdirectory being updated is required, such as may be caused by filling a directory segment causing a new subdirectory header to be created, which in turn requires updating a root directory segment, for example, is also noted to the host processor DOS for causing DOS to also update the higher directory 28 level. One of the possible responses from the update operation 220 is that disk 20 is completely full due to lack of directory structure availability.

A DOS 11 activation of update directory 220 occurs at any one of several activation points. At call 221 the machine operations 222 are activated to find a so-called header slot (slot is a colloquial term for a data storage area capable of storing a header, i.e., one or more sectors of disk 20) are activated. This set of machine operations locates a free or null sector within directory area 28 for receiving information for updating the directory 28. A new directory header entry 53, 72 is constructed by host processor 10 for the appropriate directory or subdirectory. Such new headers 53 or 72 (FIG. 3) result in the previous headers associated with filenames to be demarked or erased.

The first step of machine operations 222 is to determine whether or not the identified header control block 50 still has a free sector for receiving an additional header 53, 72. This action is achieved by activating find track slot 223 machine operations and addressing the appropriate directory header via read operations 225. These operations include identifying the appropriate track address (as above described) and scanning that header allocated track. If no free sector is available in the header allocated track, then a new track for the directory header is then allocated. This allocation results in an additional header control block 50 being created within the same directory, i.e., the root directory or an identified subdirectory. The scanning constitutes reading successive sectors of disk 20 until a null or free sector is found. If a null sector is found, then the machine operations activates find segment slot operations 224 to find a free sector or sectors in the addressed directory segment associated with the above-scanned directory header. When a free segment sector is identified, the two track and sector addresses are returned DOS 11 of host processor 10. These scans of disk 20 are implemented by machine operations represented by read 225. Once the directory information has been returned to host processor 10 DOS, at step 230 host processor 10 determines whether or not the scanned directory segment is full (which includes a free header slot from machine operations 225), then at step 231 host processor 10 records the directory information in the identified free sectors of disk 20 for both the header and segments. The return to DOS 11 occurs at return point 232; however, if the directory segment is "full" either because (1) there are no free sectors in either the current directory header allocated track or (2) in either of the directory segment allocated tracks, then in machine operations 233 host processor 10 creates a new header in header control block 50 or 71 and allocates two additional tracks for a directory segment to be identified by the new header. These operations are substantially identical to initially creating a root directory segment as described with respect to step 140 of FIG. 5 and a directory header as described with respect to step 141. In the event a segment is "full" (all sectors in the allocated two tracks are used), yet the header 53 defining that segment is not full; then only two tracks for a new segment are allocated. Allocate and format operations 234 are activated by the new header element 233. These operations allocate a track or sector (if available in current header control block) on disk 20 for receiving a new header control block. Formatting operations occur after the allocation which comprise generating the FIG. 4 illustrated data structures. The details of such formatting is well within the one of ordinary skill in the programming art. After the allocating and format operations 234, a write operation 231 records the just-formatted header on disk 20. Return to DOS 11 is taken at return point 232.

DOS 11 can also activate other portions of the update directory set of machine operations 220 such as finding a free entry (the term "entry" is colloquial for free sectors of disk 20) as activated at entry 240. The find free entry machine operations 241 may result in searching one or more levels of a directory hierarchy, i.e., a search not only the root directory but a series of subdirectories. The identification of the directory being searched is found in ODDCB 128 in path HDRS field 190. The results of these machine operations are to return the track and sector address of the available sector on disk 20 for receiving a header or segment or anchor.

Figure 5:
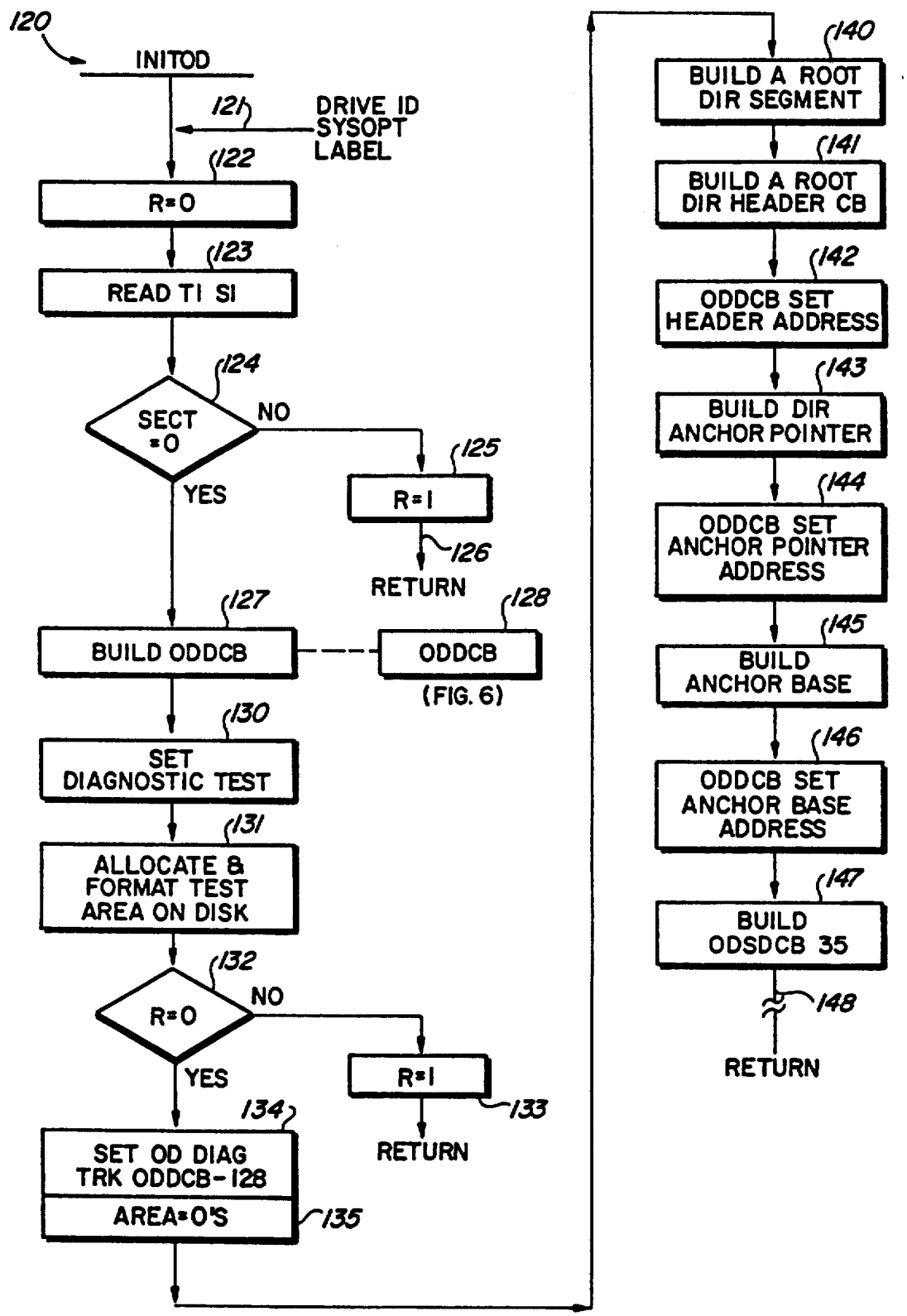
FIG. 5 is a logic flow diagram showing the initialization of the FIG. 2-illustrated record storage disk.

In finding a free directory entry by operations 241 first uses call 242 to activate find header slot operations 222 to find free sectors (also colloquially termed a "slot"). When find header slot module 222 returns an identification of a free sector in a header control block 53, 72, machine operations find free entry 241 returns the identified track and sector address to DOS 11. The return from find header slot 222 may require identifying higher levels of a directory structure, such as updating the directory anchor pointer 45 or anchor base 40, in addition to updating higher level directories. This action occurs particularly when new header element machine operations 233 occur. In that case, the sector and track addresses of the free sectors returned by header slot module 222 to find free entry module 241 may result in operations find free entry 241 causing host processor 10 to activate update anchor operations 243. Host processor 10 through update anchor operations 243 first activates find track slot operations 223, as indicated by double-headed arrow line 244, to determine if there is a free sector available in the last identified, i.e., current, directory anchor pointer segment 45. If there is a free sector available, then update anchor operations 243 enable host processor 10 to activate write operations 245 to record the operations 222 identified track and sector number in the just-allocated sector of directory anchor pointer 45 track. Otherwise, a new directory anchor pointer 45 has to be created and the operations set forth and described with respect to step 143 of FIG. 5 are then implemented for writing an anchor pointer into the newly created directory anchor pointer segment 45 by update anchor operations 243 then activating write operations 245 to record the directory information on disk 20. The operations 222 returned track and sector address is then recorded at the track just allocated for the new directory anchor pointer 45. If the above-described updating of next higher-level directory, then that higher-level directory also has to be updated to reflect the new disk 20 sector and track addresses for the lower directory entries. To achieve this result, find free entry 241 enables host processor 10 to call update directory entry operations 246. Several calls to operations 246 may be made, one for each level of the directory hierarchy.

Update directory entry operations 246 enable host processor 10 DOS to retrieve the directory entry (segment, header or anchor) from main memory of host processor 10, update the entry and write the entry to the specified disk 20 address. Firstly, search directory operations 247 (operations 247 are the same as search directory operations 202 of FIG. 7) calls update directory entry operations 246. Upon completion of the directory search, read operation 248 returns the identified directory sector (either for header, segment or anchor) to update directory (dir) entry operations 246. The extent data as described with respect to Table A is updated with all the version numbers being adjusted to reflect this update. The new extent data is added to the just-read entry for creating an updated directory entry (header and segment). The updated entry then is written to disk 20 at the track and sector addresses that were just identified by find header slot operations 222 to the find free entry operations 241. Upon completion of writing the updated directory entry to its new track and sectors, as a result of the search conducted at operations 247, the old directory entry is demarked by the update directory entry operations 246, i.e., effectively erased. In this manner, all prior file or subdirectory versions, as well as a current version, are identified and described in the last updated directory entry for the file. This type of updating leaves a single, unambiguous description of the archiving of the file on disk 20 and, at the same time, substantially reduces directory search time in directory area 28 of disk 20.

To update directory extent descriptions, DOS 11 makes a call 256 to update directory extent operations 255 for performing the updating of the extent map (as in Table A) for a specified file that is currently open, i.e., is currently being worked upon by host processor 10 (opens 165 of FEMCB 155 and opens 186 of ODDCB 128 are nonzero). The updated extent information as set forth in Table A, as an example, is maintained within main memory of host processor 10. Each time a new extent is created as by host processor 10 recording data in the user data recording area 29, FEMCB 155 (FIG. 6) is updated. The FEMCB update occurs upon completion of the writing of the data in user data area 29. DOS 11 applies input parameter data of track and sector addresses for each of the extent updates. It is noted that FEMCB 155 and as shown in Table A does not include absolute sector and track addresses based upon actual track and sector addresses, rather it is the relative number of logical sectors from the beginning of the disk. The updated FEMCB 155 is recorded in the directory area 28 each time the file is closed after a "write open", i.e., a file was opened by DOS 11 for writing data into the opened file. For example, if there are three "write opens" against the file being processed, then there may be three new versions of the file created since each time the "write open" is closed it is separately identified. This version control may be used for data integrity purposes.

The directory update process first finds the FEMCB 155 for the open file; each open file has its own separate FEMCB constructed within host processor 10 and stored in main memory. Next, DOS 11 supplies absolute disk 20 addresses for the new extents and old extents; logical addresses are recalculated. The number of logical (relative) sectors from the beginning of the open file (logical sectors) is determined by the product of the relative track times the number of sectors in a logical track. Thus the number of logical sectors used in the old FEMCB is a separate number from the number of sectors in the updated FEMCB. Both of these calculations result in relative sectors numbers (logical) taken from the beginning of the file. When such updated data are to be accessed, such relative sector numbers are converted to absolute addresses via a table lookup of directory 28. The directory 28 is updated only if writing to an open file occurs, i.e., even though the number of data storing sectors in data area 29 remains the same. The addresses of the new data which replace other data has to be determined even though the relative sector numbers may not change. A new entry is added to the FEMCB within the extent map 116, 117 (FIG. 4). The reason for this new entry is that the date and time field 113, as well as field 115 may have changed informational contents even though the number of sectors employed for storing the updated version of the open file does not change. Of course, with many updates additional sectors will be required because additional records are recorded as a part of the file.

Even if data within the file isn't replaced, as in Table A, when record 3 was updated, the relative sectors may still change. For example, referring to Table A, entry 117-1 defines extent #1 which includes record 3. In the updated file version, entry 117-1 defines extent #1U as having one sector as opposed to the original five sectors. Entry 117-2 for extent definition #2U for records 3 and 4 have new relative numbers. Similarly, entry 117-3 for extent definition #3U is a new extent in the new version and has its own relative sector number equal to two. In other words, calculations for changing the relative sector numbers has to accommodate any new extents that are created, i.e., #2U because of the newly-replaced data. The relative sector numbers for the newly-created extents and for all of the records following the newly created extent are changed. That is, dividing up extent definition #1 into two extents creates extent definition #3U beginning with record 5 having a relative sector number 2 whereas the extent definition #2U has a relative sector 8 as defined in the user area 29, i.e., eight sectors from the beginning of file. Similarly, adding records 13 and 14 created the new extent definition #5U having its own relative sector following the extent definition 2U while the relative sector number for extent #3 original (relative sectors equal 5) maintains the same relative sector but becomes extent definition #6U. From all of the above, it is clearly seen that the relative sector numbers for data that is either interleaved or updated amongst data that is not changed creates higher relative sector numbers since such data is recorded after all other data was recorded in area 29. The logical positioning of such data remains the same within the extent map with the relative sector in the extent map indicating the relative physical location in data area 29. Such updating occurs within host processor 10 each time any record is updated in area 29 on disk 20.

DOS 11 also can directly call build index operation 260 through entry point 261 for scanning a segment 58, 74 for extracting a filename and to build an index 54 for a header 50, 72 (FIG. 4). Host processor 10 builds the index whenever a new header control block 50, 72 is to be created, i.e., the previous header control block is now full. This index is built after allocated format and format operation 234 has built the new header control block in a format area of the main memory of host processor 10 and before write operations 231 is activated. DOS 11 handles the call rather than the allocate and format operations 234. The allocated track on disk 20 for the completed segment 58 to be scanned is identified by DOS 11. The field in common file header 100 filename 102 and file extension name 103 are read from each of such headers of the previous header control block by read operation 262. All tracks of the filled segment 58 are scanned. If no entries in the segment 58 allocated tracks are found, a no-hit indication is returned such that no index is built; otherwise, the index entries are assorted by ascending order by sort operation 263 (the DOS 11 sort module). After sorting, the keys 85 are extracted from each common file header added to the new header 50 in area 54 as shown in FIG. 4. Then DOS 11 causes the directory header to be written onto disk 20.

When accessing data recorded on disk 20, the extent maps 116, 117 (FIG. 4) for the version number of the file being processed has to be converted from a relative or logical sector number to a number indicating actual disk 20 track address and sector address. In FEMCB 128 the relative sector number (based upon the radially-outermost circumvolution and sector—circumvolution zero, sector zero) is converted to a track address and sector address by dividing the relative sector number by the number of sectors in each track. The residue is a sector number in the identified track while the quotient is the track number.

When sectors are addressable independent of track location, viz. sectors are numbered from O −N, where N=number of tracks times the number of sectors per track, then the logical to real conversion consists of adding the sector number of the sector storing field 91 of the common header 90 to the logical sector number.

The find spacebound machine operations shown in FIG. 9 determine the radial extremities of the directory and user data areas 28 and 29. This set of machine operations updates ODDCB 128, field 185 and 187, respectively, with the last addresses for the data and directory recordings. When disk 20 is mounted on a drive 17, host processor 10 does not know the location of the radial extremities of the data and directory areas. Included in ODDCB 128, but not shown in FIG. 6, is a field indicating the number of sectors in free space 30. This field is initially set to zero, while last data field 185 contents are set to the circumvolution and sector address indicating that disk 20 is completely filled with data. The last directory field 187 is set to zero for indicating that disk 20 is filled with directory data. A search parameter J is arbitrarily set equal to three for representing three tracks that indicates that a directory segment's 58 two tracks can be found within any three tracks in the directory area. The reason for this is that there is one directory header control block allocated track for every two directory segment allocated tracks. The machine operations also arbitrarily assume there are three data sectors allocated for every directory sector. The lowest possible track number in the search should be one (track zero contains the boot and self-describing control data while the highest number track is the track number stored in ODSDCB 35) for indicating the track address of the anchor base 40 minus one (the radially-outwardmost, next-adjacent track to the anchor base 40). Then DOS 11 at call or entry 271 activates find-spacebounds operation 270 which performs the following-described functions within the parameters set forth above. Find-spacebound operation 270 causes host processor 10 to activate read operation 272 to read the radially-centralmost track in the recording area of disk 20. This is called "the high boundary". Since there were assumed to be three data sectors for each directory sector, a first-test value for a track address is set forth for three-fourths sum of the low and high boundaries, i.e., at three-fourths the radial distance toward the radial-inwardmost track. This test track is then read through read operation 272. If the data read back turns out to be a directory entry, then the high-boundary value track for the data area 29 stored in main memory at field 185 of ODDCB 128 is then adjusted to the test track address. Then the next-tested track to be read has an address which is the sum of the new value for the high boundary for the data area summed to the low boundary divided by two. This procedure is repeated until the radial extremity of the directory segments and the extremity of the directory area are found.

If the data read is not a directory segment, i.e., is user data, then the next test track radial location will be one-half of the sum of the just-read track address (new low boundary for the directory area) plus the high boundary address. This process is then repeated provided there is not equality between the just-tested tracks and the low boundary or the high boundary are equal to indicate there is no free space (disk 20 is full).

However, it can be assumed that at three-fourths of the radially-inwardmost track should be a directory, therefore, three radially-adjacent tracks can be read to try to find a directory segment. The adjustment continues until the track test address comes into the data area. If the data area, in fact, does extend radially inward to the three-quarter radial point, the test will probably result in a null return, i.e., no data has been recorded in the test track nor is there is a directory entry recorded in such test track. In that case, the high boundary is set to the current track address minus one, i.e., the next-radially-outwardmost track could contain user data. The radially-outwardmost boundary for the directory is then set to the test track radial address plus one, i.e., the next radially-inwardmost track could contain a directory segment indicating there is free space.

A demarked sector may occur in any of the tests. Then the test value J is reset to three with the search started again for the directory segment. However, the test track number is increased by one for finding the directory. At this point, operations 270 causes host processor 10 to activate search bounds operation 273 for identifying the extremities of the data and directory areas 29 and 28. This module enables host processor 10 to identify the track and sector number on disk 20 of the bounds. Such bounds are the address values for the high and low possibilities calculated by find spacebound operation 270, i.e., some data areas have been identified as well as directory areas but the radial extents are not precisely known. A track address value is set to one-half the last-identified high and low bounds. If this test track address value equals either the high or low value, then one of the radial extremities has been identified; then a read operation 272 is activated for reading the test track. If a null sector is found, then the high bound is set to the just-read track address value or the value called null is identified as a track address value as having a null sector. The process is repeated until a lowest addressed null sector is found. Once the lowest null sector is found, then a similar process is followed for finding the highest or radially-inwardmost null sector. In that case, if a null is found the test track is set to the low address value until a non-null sector is found. Then the track address of last-tested tracks represents the high-radial boundary.

In addition to the programming in DOS described for an understanding of the present invention, it is to be understood that programming as currently exists in DOS as represented in the referenced IBM publications will also be included; in later embodiments of the DOS or embodiments of similar operating systems, it is to be expected that a diversity of different functions and machine operations implemented through programming will be utilized. Variations of organizations in the scope of the present invention should be visualized.

Using the above-described directory and recording techniques, detection of a media defect while recording data or directory information on the disk results in that sector having the media defect being ignored and recording the information in the next available sector. The practical effect of this procedure is to move the unrecorded portion of the data or directory being recorded one sector position along the spiral track on disk 20. The directory is created in such a manner that the defective sector is ignored in the directory structure, i.e., as if it does not exist at all. This type of media defect accommodation works well with the described directory and its extent structures of the present invention. The data recorded in contiguous sectors immediately preceding the defective sector are contained in a first extent. The continued recording in the spiral track following the defective sector (the defective sector is skipped) defines the onset of a second independent extent of contiguous sectors. This type of operation requires that the directory accommodate changes in addresses of the data as the data is, in fact, recorded on the disk 20. This is but one example of the value of the defined data extents in the current directory structure.

Some users of disk media, as described herein, may have a master disk containing preassigned relationships between the physical sectors on a disk and the logical addressing structure of computer programs designed to operate with such stored data. In that instance, the above-described media defect accommodation become inoperative in that the physical addresses of the stored data are changed such that the computer programs no longer can faithfully access the data stored on the disk.

Accordingly, the present invention provides for two alternate means of media-defect accommodation on a single record disk medium. For purposes of discussion, it is assumed that the master disk containing the above-described computer program to physical disk locations will be provided at a manufacturing site of disks which employ the above-described directory. According to the present invention, a separate portion of disk 20 is assigned or reserved to that recording based upon the master disk addressing. Such an arrangement is shown in FIG. 10 on disk 20A (A means alternative disk arrangement). By arbitrary selection, the portion assigned on disk 20A for storing master disk preassigned recorded data is reserved to a radial-outwardmost portion of the data recording area 29 (FIG. 2) of disk 20. The disk control sector (27) includes, in the ODSDCB 36, the number of circumvolutions containing the master disk data. In this manner, a controller 15 first reading a disk 20 reads an ODSDCB 36 that such tracks or circumvolutions have a different media-defect accommodation scheme than in other ones of the tracks, i.e., the media-defect accommodation requires controller 15 and possibly host processor 10 intervention rather than the transparent defect accommodation afforded by the present invention. Explaining further, in order to maintain the physical address to data contents of the master disk (not shown) on disk 20A requires that the media-defect accommodation follow generally the practice used in present-day magnetic disk recording; that is, a sector demark be provided into the defective sector together with an address pointer to an alternate data storage area. However, since the entire sector may be unrecordable, all that is required in the defective sector is to identify the fact that it is defective and no data is recorded therein.

In accordance with the present invention, at a radial-inwardmost portion of the disk, for example, even radially-inwardly of directory 28 is an alternate data storage area 282 for accommodating media errors when recording master disk data on the disk. The innermost-radial circumvolution 280 can be a guard band track or diagnostic track as is usually practiced in either magnetic or optical data recording. The circumvolution 281 contains an index to the alternate recording areas as required by the defective sectors in the portion of disk 20A storing the master disk data. A small number of circumvolutions 282 constitute the alternate sector data storage area. When recording the master disk data into the radially-outwardmost assigned area for such data, upon detection of a defective sector, rather than pushing the sector addresses downwardly along the spiral track, the data assigned to the defective sector is retained by software (not shown or described) using usual techniques within a host processor used to record the master disk data onto disk 20. Upon completion of the recording, the host processor still retains data intended for one or more defective sectors in the preassigned master disk data storage area. At this time, the alternate circumvolutions 282 are recorded with the data and an index to such alternately-recorded data is set up in circumvolution 281 using a format as shown in FIG. 10. The recording in circumvolution 281, as well as all other circumvolutions, begins in data sector zero and proceeds counterclockwise as shown in FIG. 10 to data sector 23, as required. Within data sector zero and other data sectors of the table area circumvolution 281, a first byte 285 has a fixed data content or indicator equal to E0. The next downstream byte of circumvolution 281 is a sequence number SN stored in area 286. The first sector in circumvolution 281 containing the set of table entry is identified as number zero. The next data sector in the same circumvolution contains sequence number one and so forth. In the event a defective sector is found in circumvolution 281, that sector is ignored with the next available data sector in circumvolution 281 being used to record the table data originally intended for the defective sector. The sequence number in field 286 remains the same irrespective of which physical data sector is used to store that portion of the alternate data track table. Following byte 286, byte groups 287, 288 and 289, et seq. respectively contain the addresses of the defective sectors in the master data recording area. Scanning circumvolution 281, the reading host processor 10 determines which of the groups 287, 288 and so forth relate to a defective sector of interest. The number of addresses 287, 288 and so forth correspond to the number of data sectors available in the plurality of tracks 282. The logical location of the defective area address in addresses 287, 288, 289 et seq. are used to point to the sector in tracks 282 which in fact store the data being alternately stored. For example, while the numerical contents of address 287 (which is identified as defective pointer zero) points to the defective and demarked data storing sector, the physical location being the first address in a circumvolution 281 data sector zero points to data sector zero of the radially-inwardmost circumvolution of area 282. Similarly, defect pointer number 1 constituting address 288 points to data sector one in such radially-inwardmost circumvolution of area 282, and so forth for the complete set of circumvolutions in area 282. In the event that a defective sector is found in the alternate circumvolution area 282, then the address area corresponding to that defective sector contains all binary ones for indicating that the logically-related alternate sector is defective and, of course, unused.

In accordance with all of the above, it is seen that an efficient means are provided for accommodating diverse alternate sectoring which in turn accommodate diverse addressing architectures on the same record medium. In accordance with the present invention, the data area 29 assigned to the master disk data may fill up a great majority of the allocatable data area, i.e., directory 28 can be relatively small and possibly nonexistent; however, for example, if the master data is a computer program to be executed by a reading host processor 10, then some circumvolutions can be reserved for providing computer program updates to be written onto the disk 20 by a using host processor 10. In this manner, a program vendor can electronically transmit updates to a host processor 10 for incorporation onto disk 20 which serves as a program record medium. Then when host processor 10 loads the program into its own memory from disk 20 it will include programming (not described) for checking the directory 28 for identifying updates to the initial program represented by the master disk data. Since such programming is well within one of ordinary skill in the art, it is not further described.

Referring now more particularly to FIG. 11, an enhanced performance of a data storage system employing the present invention is achieved by using the arrangements shown in this figure. The host computer 10 includes a random-access data storage portion 301 which is the operating storage for the computer. The software (not shown nor further described) of the host computer 10 allocates a portion of storage 301 to serve as a software cache 306 for data to be cached with respect to data stored or to be stored on disk 20 and a cache 302 for storing a portion of the current directory. When the locate and connect function 201, shown in FIG. 7, identifies a segment of the directory on disk 20 identifying data areas to be accessed, then the entire directory contents of the current segment 300 is stored in the current directory cache 302 as indicated by double-headed arrow 303. The host computer 10 may update the copy in the current directory cache 302. Upon completion of data processing operations, beyond the scope of the present description, the updated copy is then stored into the current segment 300 provided such storage space is still available. If the current segment 300 is filled, then the last directory segment which still contains recordable sectors will receive the updated directory portion. In a similar manner, the data stored in accordance with a filename 305 is stored in data cache 306. Host computer 10 then operates upon the data stored in data cache 306 and the directory portion stored in current directory cache 302. Upon completion of the data processing operations, the updated data in data cache 306 is stored onto disk 20 as previously described for updated data.

It is expected that in many operational occurrences that current segment 300 will be the segment that is yet to be filled in the directory, i.e., is not completely filled. It should be noted that the contents of the current segment 300, regardless of which filename file has been or is desired to be accessed, is promoted to the host computer 10. It should also be noted that header area 310 is radially outward of the current segment 300 but is not promoted to the current directory cache 302. This arrangement follows the disk 20 initialization procedures described with respect to the FIG. 5 wherein the lower or more direct portions of the directory are recorded closer to the starting point than the indexing portions.

The operation of caches by host computers and the data transfer between caches and backing stores such as disk 20 is well known and that further description thereof is dispensed with. The important thing to note is that the contents of the entire current segment is promoted to the current directory cache for enabling rapid access to the directory identifications and addresses of all filenames of the current segment. In one version of practicing this portion of the invention, as soon as data transfer is initiated between a host computer 10 and a disk 20, the current segment that has been identified is always promoted to the current directory cache. For any filename not contained in the current segment is to be accessed, then the segment identifying that new filename replaces the current segment in the current directory cache 302.

A data extent is a series contiguous data storing sectors which store data from a given file. As an example, a first data extent 320 (FIG. 12) includes nine data storing sectors each of the data storing sectors storing in two records respectively enumerated 1-18 for the nine sectors. The encircled numbers 4, 8, and 9 indicate the allocated space within a sector wherein no data is recorded. The lowest numbered record in each of the data storing sectors is determined by the equation $NX-(N-1)$ wherein N is the number of records to be stored in a given sector and X is the logical number of the sector within a file. Logical number of a sector should not be confused with the physical number of a sector on the record disk. Both numbers and an X are integers In the first recording, a bad sector was encountered on the disk as represented by the space 321. The recording continued and a second set of contiguous sectors indicated by numeral 322 containing logical sectors 10 and 11. In the second extent 322, two records 20 and 21 are recorded respectively in logical sectors 10 and 11, while record areas 19 and 22 have no data stored therein. Note that while one sector could be used to stored the records 20 and 21, two sectors are allocated for ensuring an easy updating procedure in the indelible medium. Let's assume that logical sector 5 is to be updated by filling in record 9 and not changing record 10. After the update, rather than having two data extents, four data extents are required for identifying the updated recorded data. The updated logical sector 5 now contains records 9 and 10, as indicated at numeral 323. This updating breaks the original data extent 320 into three parts. A first part is a data extent 324 including logical sectors 1 through 4; a second data extent 325 which includes only the logical sector 5 (as represented by numeral 323) and a third extent 326 consisting of logical sectors 6 through 9. The other data extent 322 is unchanged (as indicated by numeral 327). The logical sectors within each file have no physical relationship to the physical sectors on disk 20 except within a data extent. Logical sectors are used to identify the directory entries for the data versions, as discussed earlier.

While the invention has been particularly shown and described with reference to preferred embodiments thereof, it will be understood by those skilled in the art that various changes in form and details may be made therein without departing from the spirit and scope of the invention.

What is claimed is:

1. In a data processing apparatus having a data storage unit using a continuous address space bounded by first and second addresses with a plurality of addressable data storage sectors addressably accessible by addresses in the address space;
the improvement including, in combination:

data receiving means in the data storage unit for repeatedly receiving records of diverse data for storage in the data storage unit, said data receiving means being connected to the data storage unit for storing the received data in the data storage unit at predetermined ones of said addressable data storage areas;

directory creating means in the data receiving means for creating record directory entries having an identification of the received and last-stored records of data and an address pointer identifying the addressable data storage areas in which said received and last-stored records of data are stored;

directory segment module creating means in the directory creating means for accumulating said record directory entries into a segment set of such entries as a directory segment module, directory recording means connected to the directory segment module creating means and to the data storage unit for determining whether or not the created directory segment module is first created directory segment module and to record said first created directory segment module in a first one of the addressable data storage areas;

directory header creating means in the directory creating means being connected to said directory segment module creating means and to said directory recording means for responding to said directory recording means determining that the created directory segment module is not a first created directory segment module for creating a directory heading including an index to the predetermined previously-recorded directory segment module; and said directory recording means being responsive to said directory header creating means creating said index to record both said created header and created directory segment module in a given one of said addressable data storage sectors which is adjacent in the data storage unit to said first one of the addressable data storage sectors, whereby the index to the records of the sector is recorded in the next adjacent sector.

2. In the data processing apparatus set forth in claim 1 wherein said data storage unit is a disk recorder having a rotatable record storage disk with a data receiving surface with an inner radius at which an inner given one of said data storage areas is located and is addressable by a one of said bounded addresses and having an outer radius at which an outer given one of said data storage areas is located and is addressable by another one of said bounded addresses.

3. In the data processing apparatus set forth in claim 2 wherein said rotatable record storage disk is removably mounted in said data storage unit, said data receiving surface exhibiting write-once data recording characteristics, and said data storage unit includes optical data recording and sensing apparatus.

4. In the data processing apparatus set forth in claim 3 further including, in combination:
said directory segment creating means having reading means for identifying and reading any previously recorded directory segment for the last-stored record and for adding the directory entries of said previously recorded directory segment to the created directory segment such that each directory segment includes a copy of all previously recorded directory entries for the respective last-stored records of data.

* * * * *